(12) United States Patent
Inaba

(10) Patent No.: US 6,253,031 B1
(45) Date of Patent: Jun. 26, 2001

(54) STEREO PHOTOGRAPHIC SYSTEM

(76) Inventor: Minoru Inaba, No. 1116, Oaza Samukawa, Oyama-shi Tochigi-ken (JP)

( * ) Notice: Subject to any disclaimer, the term of this patent is extended or adjusted under 35 U.S.C. 154(b) by 0 days.

(21) Appl. No.: 09/199,236

(22) Filed: Nov. 24, 1998

(51) Int. Cl.$^7$ .................................................. G03B 35/00
(52) U.S. Cl. ........................................... 396/326; 396/328
(58) Field of Search ................................... 396/322, 324, 396/326, 328, 333

(56) References Cited

U.S. PATENT DOCUMENTS

| | | | |
|---|---|---|---|
| 2,292,312 | 8/1942 | Wittel et al. | 40/707 |
| 2,739,401 | 3/1956 | Balter | 40/702 |
| 2,823,478 | 2/1958 | Ostergaard et al. | 40/707 |
| 2,842,883 | 7/1958 | Folwell et al. | 40/702 |
| 3,133,368 | 5/1964 | Perrot | 40/701 |
| 3,235,991 | 2/1966 | Harper et al. | 40/705 |
| 3,242,605 | 3/1966 | Kleinschmidt | 40/705 |
| 3,389,485 | 6/1968 | Roubal | 40/705 |
| 3,808,722 | 5/1974 | Byers et al. | 40/705 |
| 4,104,818 | 8/1978 | Hrabik | 40/707 |
| 4,132,480 | 1/1979 | Reed | 355/75 |
| 4,314,416 | 2/1982 | Lorsch | 40/701 |
| 4,431,282 | 2/1984 | Martin geb. Boser | 352/120 |
| 5,392,548 | 2/1995 | Truc et al. | 40/705 |
| 5,685,626 | 11/1997 | Inaba | 353/120 |
| 5,832,325 | * 11/1998 | Ito et al. | 396/326 |

* cited by examiner

*Primary Examiner*—David M. Gray
(74) *Attorney, Agent, or Firm*—Fattibene & Fattibene; Paul A. Fattibene; Arthur T. Fattibene

(57) ABSTRACT

A stereo photographic system capable of reproducing a correct stereo image by improving the precision of positions for mounting the films on a stereo slide mount. Positions of the projected images of perforation of the films relative to the focusing plates are measured when a suitable perspective feeding is obtained by using a detecting device that projects the pictures of the films onto a pair of right and left focusing plates and that adjusts the gap between the right and left projected pictures to adjust the perspective feeling. A printer device 81 drives a printer head 87 based upon the position data that are measured, and prints indexes on a base frame 51*a* of the stereo slide mount to accomplish the positioning with respect to the perforations. When the films are mounted in a manner that the indexes of the base frame 51*a* are in agreement with the perforations of the films, the offset amount of the pictures of the films relative to the windows of the stereo slide mount is fixed to a position relatively equal to the offset amount of the projected pictures relative to the focusing plates detected by the detecting device.

18 Claims, 25 Drawing Sheets

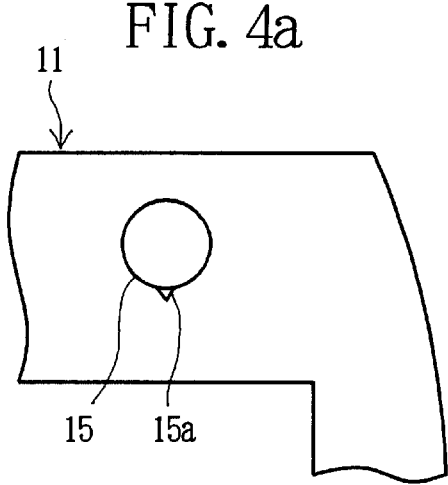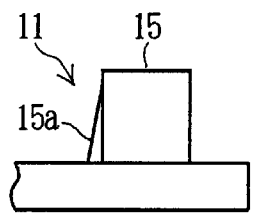

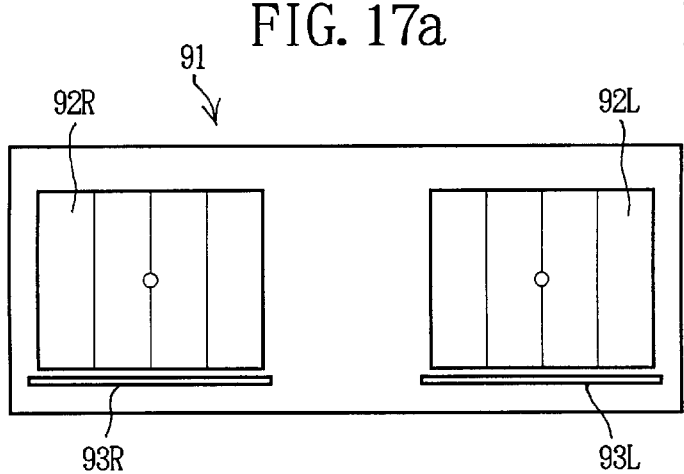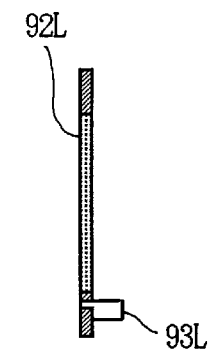

STEREO PHOTOGRAPHIC SYSTEM

BACKGROUND OF THE INVENTION

1. Field of the Invention

The present invention relates to a stereo photographic system comprising a stereo camera, a stereo slide mount and peripheral equipment. More particularly, the invention relates to a stereo photographic system which facilitates the mounting operation and correctly reproduces a stereo image.

2. Description of the Prior Art

When the two frames of stereo photographic reversal films are to be mounted on a stereo slide mount, attention must be given to a positional relationship between the right and left films. In particular, it is important to so adjust the mounting offset of the films that a subject that most seriously affects the matching between the right and left pictures (degree of effect varies depending upon the size, position, color, contrast of a subject, and, particularly, a subject in a close-range view affects greatly) is located at equal positions in the right and left pictures.

When the films are mounted on proper positions, a natural three-dimensional view is obtained when the films are viewed using a stereo slide viewer. When the positions of the subject that most seriously affects the matching are not in agreement between the right and left pictures, however, a person finds an offensive feeling when he views the image accompanied by serious feeling of fatigue.

Due to a difference in the visual fields of the right and left photographing lenses of the stereo camera, furthermore, a pair of right and left reversal films photographed by a stereo camera develop a non-overlapping portion in which the photographing regions are not in agreement at the outer edges of the pictures on the right and left films. In the non-overlapping portion, no three-dimensional image is formed despite it is viewed using the stereo slide viewer. When a stereo photograph without masking the non-overlapping portion is viewed by two eyes, a vertical line on which the edge of another window is superposed appears on a boundary between the overlapped portion and the non-overlapped portion to impair the interest. In order to prevent this, therefore, it has been attempted to form the windows of the stereo slide mount having a width smaller than the width of the pictures on the films, and to place the subject that most seriously affects the matching of the right and left pictures at nearly equal positions on the right and left pictures of the stereo slide mount by masking the non-overlapping portion.

The ratio of the non-overlapping portion occupying the picture increases with a decrease in the photographing distance. Therefore, plural kinds of stereo slide mounts having stepwisely changing window widths are prepared, and the films are mounted by selecting the one having a window width that is considered to offer an optimum masking amount.

However, it is not easy to judge by eyes a suitable picture-masking amount of the films or the offset amount, and there are frequently found stereo slide amounts offering unnatural stereo effect due to the films that are mounted in an undesirable state.

Therefore, there arises a technical problem that must be solved to provide a stereo photographic system that makes it possible to judge the positions for mounting the films on the stereo slide mount, to judge a suitable picture-masking amount, and to easily execute the mounting operation. The object of the present invention is to solve the above-mentioned problem.

SUMMARY OF THE INVENTION

In order to accomplish the above-mentioned object, the present invention provides a stereo photographic system comprising:

a stereo camera equipped with a device for projecting indexes to the upper or lower side of a pair of right and left pictures of the films at the time of photographing; and a stereo slide mount;

wherein indexes are provided under or over the pair of right and left windows of the stereo slide mount to come into agreement with the indexes of the films when the windows of the stereo slide mount and the pictures of the films are brought into agreement with one another, so that the windows of the stereo slide mount and the pictures on the films can be easily positioned.

The invention further provides a stereo photographic system wherein a suitable masking amount or offset amount of pictures on the films is detected by a detecting device, perforations at the edge of the films for the picture windows at that moment or positions of indexes recorded in advance on the edges of the films are detected, indexes corresponding to the positions of the detected indexes of the film are printed on a stereo slide mount using a printer, and the films are mounted by bringing the indexes into agreement with the indexes recorded on the films, so that the positions of the pictures of the films can be correctly determined relative to the windows of the stereo slide mount.

The invention further provides a stereo photographic system wherein protuberances are formed on a base frame of the stereo slide mount by a protuberance-forming device based upon the data related to the positions of the detected perforations, and the films are mounted in a manner that the perforations of the films are engaged with the protuberances, so that the positions of the pictures of the films can be correctly determined relative to the windows of the stereo slide mount.

BRIEF DESCRIPTION OF THE DRAWINGS

FIG. 3 illustrates a stereo slide mount of a stereo photographic system of claim 1, wherein

FIG. 4 is a front view illustrating, on an enlarged scale, a pin portion on the base frame, and FIGS. 4b and 4c are side views of the pin portion;

FIG. 17 illustrates a focusing plate in the testing device and a portion of an image sensor, wherein FIG. 17a is a front view as viewed from the side of the projecting lenses, and FIG. 17b is a side sectional view thereof;

FIG. 23 illustrates a die plate, wherein

DETAILED DESCRIPTION OF THE PREFERRED EMBODIMENTS

An embodiment of the present invention will now be described with reference to the drawings. A stereo photographic system is constituted by a stereo camera having a function for exposing the films to the indexes at the time of photographing, and a stereo slide mount provided with indexes corresponded to the indexes on the films.

Figure 1:
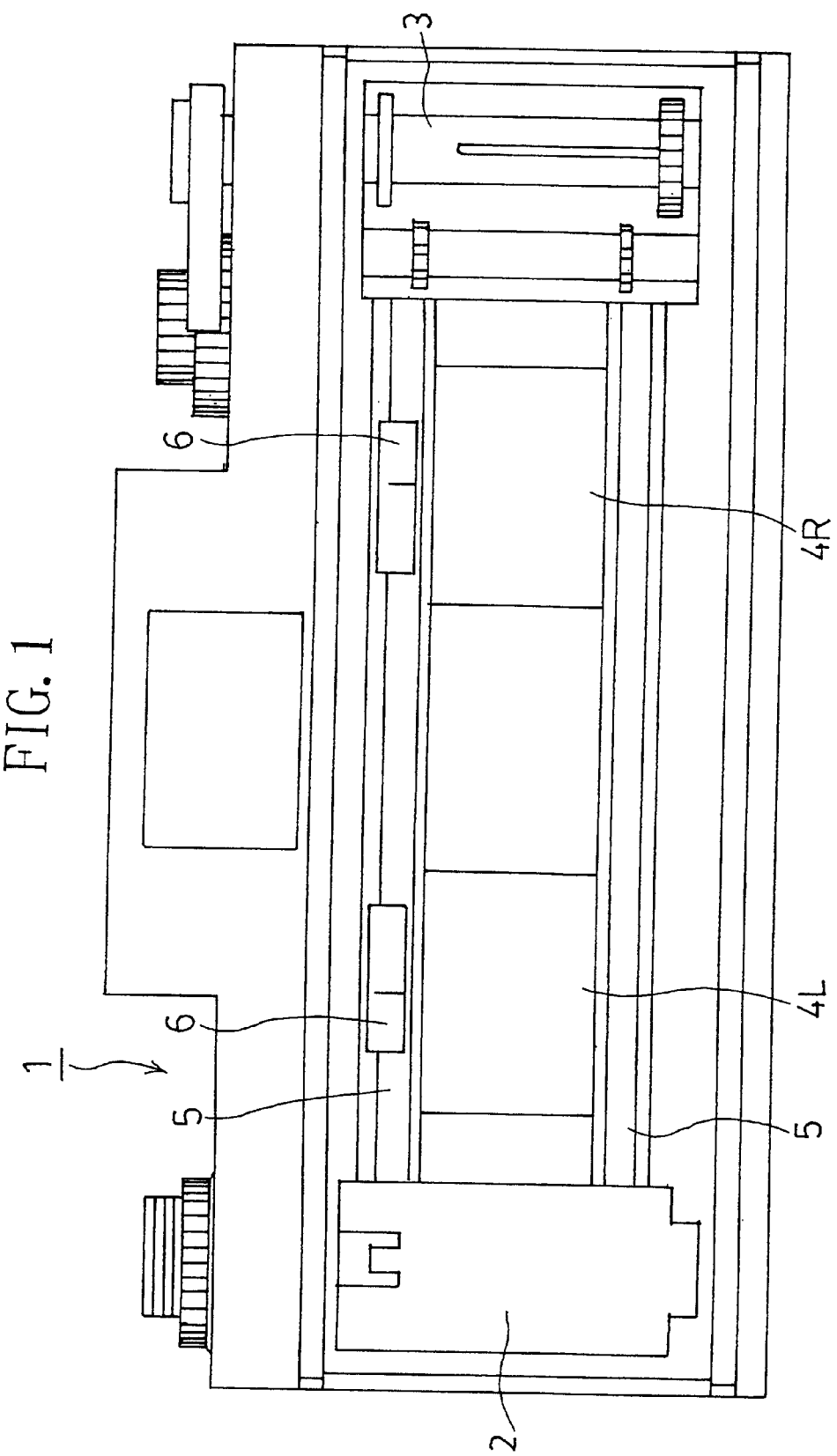
FIG. 1 is a back view of a stereo camera.

FIG. 1 illustrates a state where a back closure is removed from a stereo camera 1. Like a general camera, a Patrone-loading chamber 2 at the left end of the body is loaded with a 135-type film, the end of the 135-type film is anchored to a film take-up shaft 3 at the right end, and the film is taken up by the film take-up shaft 3. A pair of right and left photographing windows 4L and 4R are formed between the Patrone-loading chamber 2 and the film take-up shaft 3.

A pair of right and left index-exposing devices 6R and 6L are disposed on an upper film guide 5 in the film running passage. Like a general data recorder for recording date and data related to photographing, the index-exposing devices 6R and 6L expose the films to light by causing the LEDs to emit light being interlocked to a shutter, in orer to record fine vertical lines on the films at the edges outside the pictures.

Figure 2:
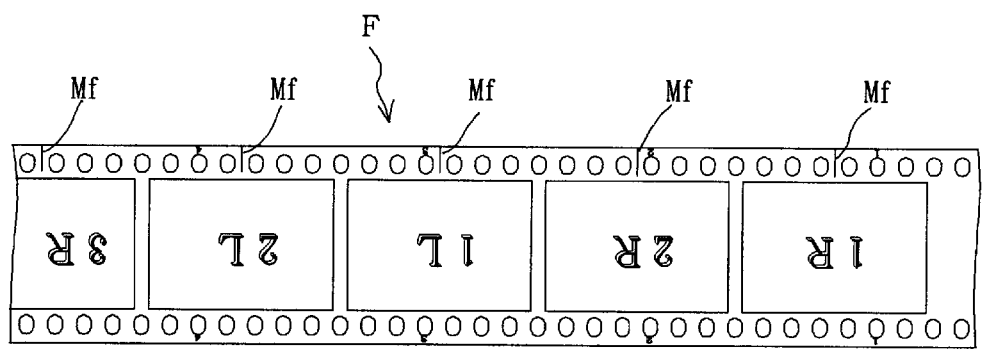
FIG. 2 is a front view of film strips photographed by using the stereo camera of FIG. 1.

FIG. 2 illustrates film strips F photographed by using the stereo camera 1. Index Mf of a vertical line are projected onto the upper outside of the pictures 1R, 2R, 1L, 2L, - - -. There are maintained a predetermined positional relationship between the right picture R and the index Mf above the right picture R thereof, and a predetermined positional relationship between the left picture L and the index Mf above the left picture L thereof.

The image projected onto the films through lenses of the stereo camera 1 is inverted upside down and right side left as viewed from the back side of the camera. Therefore, the films are mounted on the stereo slide mount being turned by 180 degrees so as to establish the state of an erect image. In the mounted state, therefore, the indexes Mf are located at the lower edges of the films.

Figure 3A:
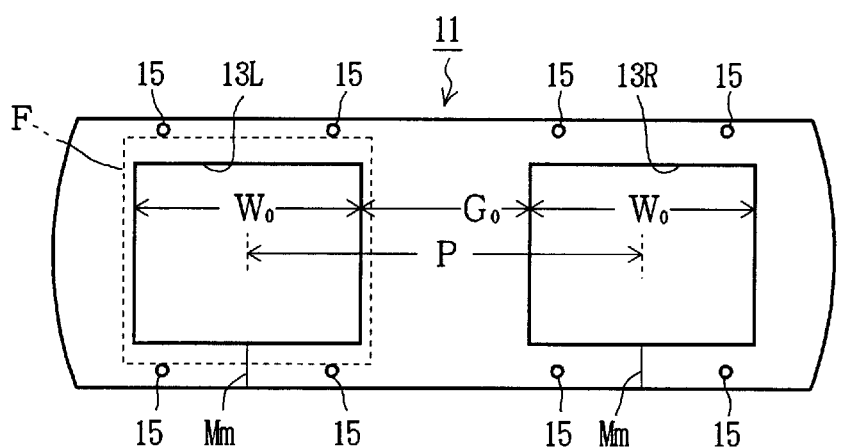
FIG. 3a is a front view of a base frame.
Figure 3B:
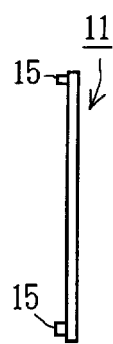
FIG. 3b is a side view of the base frame.
Figure 3C:
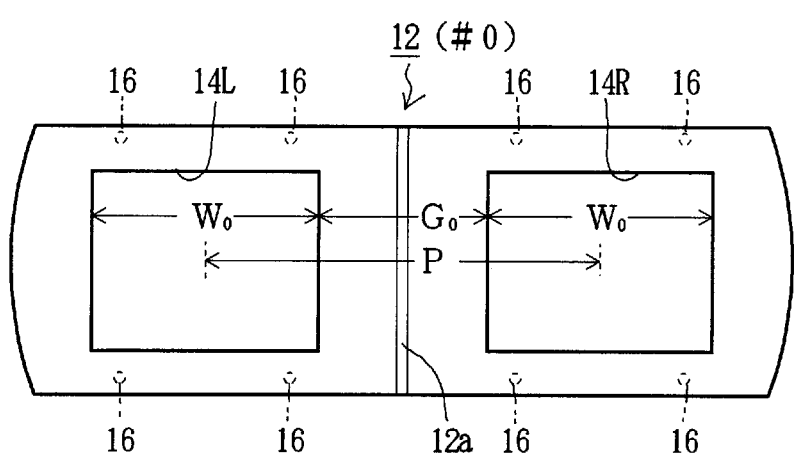
FIG. 3c is a front view of a cover frame.
Figure 3D:
FIG. 3d is a side view of the cover frame.

FIG. 3 illustrates a stereo slide mount in the stereo photographic system, which is constituted by a base frame 11 shown in FIGS. 3a and 3b, and a cover frame 12 shown in FIGS. 3c and 3d. The base frame 11 and the cover frame 12 formed by injection-molding a resin are provided with right windows and left windows 13R, 13L, 14R, 14L, respectively. A pitch P between the windows 13R, 13L, 14R, 14L has been set to be about 63 mm which is close to a pitch between the two human eyes. The windows 13R, 13L, 14R, 14L have vertical and lateral sizes that are nearly equal to the sizes of pictures of the reversal films, so that the whole pictures of the films can be seen. Cylindrical pins 15 are erected at upper right and left, and lower right and left of the windows 13R, 13L of the base frame 11, and a distance between the upper and lower pins 15 is the same as the vertical width of the film F. When the film is inserted between the upper and lower positioning pins 15, the vertical centers of the windows 13R, 13L of the base frame 11 are brought into agreement with the vertical centers of the pictures on the films F.

Under the windows 13R, 13L of the base frame 11, there are printed indexes Mm of vertical lines corresponding to the indexes Mf recorded on the films F so as to accomplish the lateral positioning of the films. When the indexes Mf of the films F placed on the base frame 4 are brought into agreement with the indexes Mm of the base frame, the pictures on the films F are brought into correct agreement with the windows 13R, 13L of the base frame 11.

Referring to FIG. 4, a wedge-shape rib 15a is formed on a surface of the pin 15 in contact with the film. When the film is inserted with pressure between the pins 15 after the lateral position of the film has been determined, the rib 15a bites into the edge of the film F, so that the film F is secured.

Referring to FIG. 3c, pin holes 16 are formed in the cover frame 12 at positions symmetrical to the pins 15 on the base frame 11. When the pins 15 are fitted into the pin holes 16, the base frame 11 and the cover frame 12 are joined together.

A vertically oriented grooved hinge portion 12a is formed at the lateral center of the cover frame 12, enabling the cover frame 12 to be folded at the center. Films are adhered to predetermined positions of the right and left windows of the base frame 11, the left portion of the cover frame 12 folded at the center is overlapped so that the positioning pins 15 are fitted to the pin holes 16 and, then, the right portion of the cover frame 12 is fitted to the base frame 11, so as to join the base frame 11 and the cover frame 12 together.

To facilitate the mounting operation, a tackifier should be applied to the periphery of the right and left windows of the base frame 11. In this case, if a pressure-sensitive adhesive agent obtained by sealing an adhesive agent or a tackifier in a microcapsule is used, adhesion does not undesirably occur before the film is positioned, and the film is secured by pressing or rubbing the surface after it has been positioned, facilitating the mounting operation.

Moreover, a shallow groove having a vertical width equal to the vertical width of the film may be formed in the base frame, so as to position the film in vertical direction, and the pins and the pin holes may be used as means for simply joining the base frame and the cover frame together.

The mounting system in the stereo photographic system is constituted by adding plural kinds of cover frames 12 shown in FIGS. 5 and 6 to the stereo slide mount shown in FIG. 3.

Figure 5A:
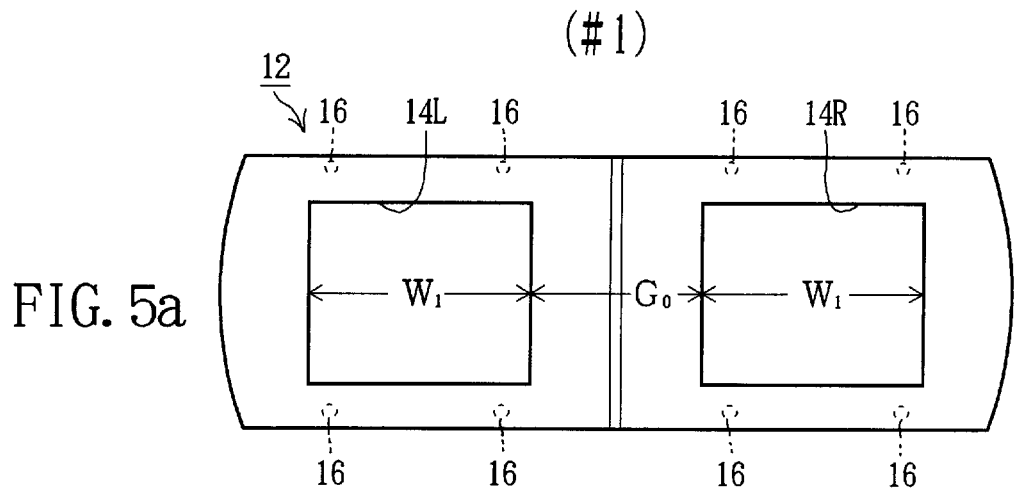
FIGS. 5a, 5b and 5c are front views of the cover frames.
Figure 5B:
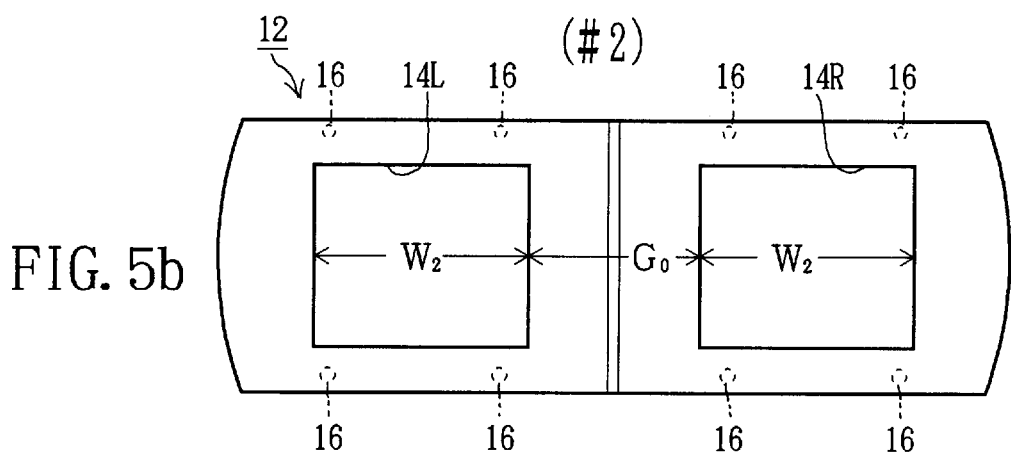
Figure 5C:
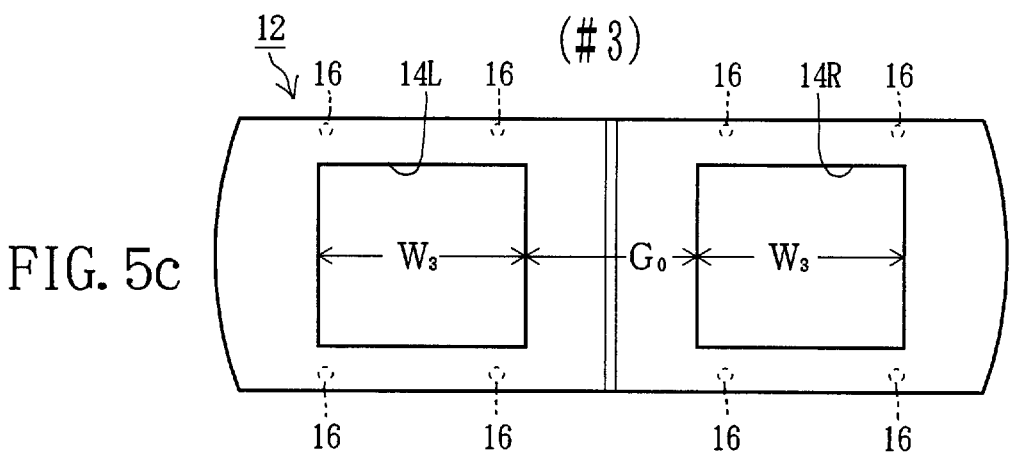
Figure 6A:
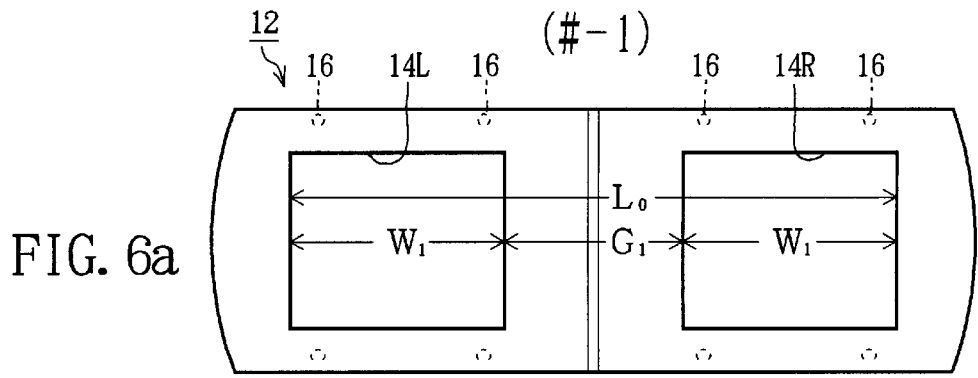
FIGS. 6a, 6b and 6c are front views of the cover frames.
Figure 6B:
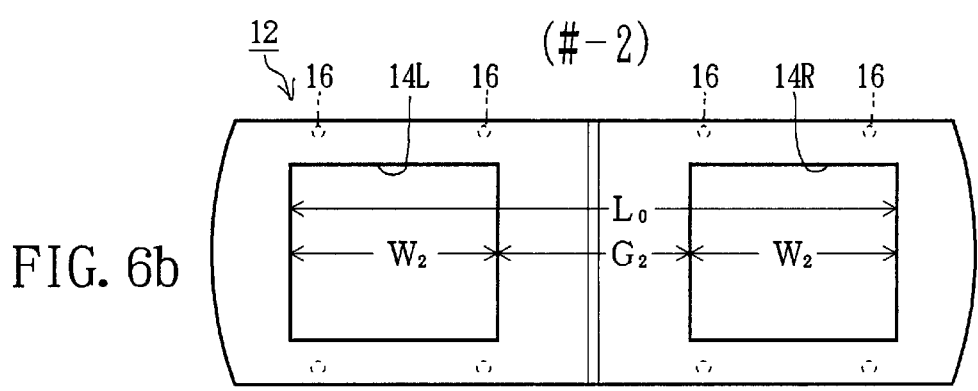
Figure 6C:
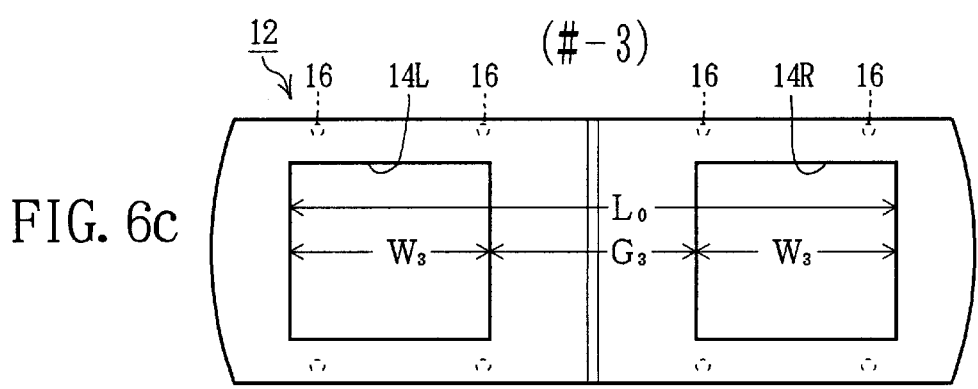

The cover frame 12 includes the one (#0) in which the gap G between the right and left windows 14R, 14L and the width W of the windows are equal to the gap G0 between the windows and to the width W0 of the windows of the base frame 11 as shown in FIG. 3, as well as those (#1 to #5) in which the gap G0 between the windows remains the same and the width W of the windows decreases gradually and stepwisely as shown in FIGS. 5a, 5b and 5c, and those (#−1 to #−3) in which the width L0 between the outer edges of the right and left windows 14R, 14L is equal to the width L0 between the outer edges of the right and left windows 13R, 13L of the base frame 11 and the width W of the window stepwisely decreases as shown in FIGS. 6a, 6b and 6c. The shielding areas of the outer side or the inner side of the pictures on the right and left films stepwisely change depending upon the identification number of the cover frame 12 joined to the base frame 11. The cover frames 12 (#−1 to #−3) are used for adjusting the masking amounts at the inner ends of the films photographed in a state where the parallax is excessively corrected (gap between the lenses is too small) due to erroneous operation by using the stereo camera equipped with a mechanism for adjusting the distance between the optical axes. Usually, the parallax is corrected by adjusting the masking amount at the outer ends of the pictures by using a stereo slide mount of #0 to #5. In the stereo photographic system using the stereo camera of the type in which the distance between the optical axes is fixed, therefore, there can be used a mount system without including the cover frame of smaller than #−1.

A cover frame having windows a width suited for a set of stereo photographs can be selected from the above-mentioned cover frames 12 by using a masking amount testing device that has been proposed already by the applicant of the present application.

If the testing device is briefly described, there are arranged right and left optical systems each being constituted by a projecting lens, a focusing plate having a collimation pattern and an eyepiece. There are further provided a projection magnification-adjusting mechanism for moving the projecting lenses in the direction of the optical axis, a mechanism for adjusting the gap between the focusing plates, and an adjusting knob for linking the two adjusting mechanisms together.

When the film guide arranged at the back of the projecting lenses is loaded with the developed film strips, the pictures of the pair of right and left stereo photographs of the film strips are separately projected through the right and left projecting lenses onto the right and left focusing plates equipped with the same collimation pattern.

The adjusting knob is provided with a dial describing numerals corresponding to the identification numbers of the cover frames 12. In a state where 0 on the dial is set to the fixed index, the whole pictures of the films are projected onto the focusing plates. A turn of the adjusting knob in the plus direction or in the minus direction is accompanied by a change in the magnification of projection and in the gap between the focusing plates.

When the adjusting knob is turned in the plus direction, the gap between the focusing plates decreases accompanying an increase in the magnification of projection, and the magnification of projection undergoes a change in a state where the inner edges of the right and left focusing plates are in agreement with the inner edges of the projected pictures irrespective of the amount of turn. When the adjusting knob is turned in the minus direction, the gap between the focusing plates increases accompanying an increase in the magnification of projection, and the magnification of projection undergoes a change in a state where the outer edges of the right and left focusing plates are in agreement with the outer edges of the projected pictures irrespective of the amount of turn.

That is, when the adjusting knob is turned in the plus direction, the outer edges of the right and left projected pictures go beyond the outer sides of the focusing plates accompanying an increase in the magnification of projection, so that the outer sides of the right and left projected pictures are masked. When the adjusting knob is turned in the minus direction, the inner edges of the right and left projected pictures go beyond the inner sides of the focusing plates accompanying an increase in the magnification of projection and are masked.

When the magnification of projection is changed by turning the adjusting knob while observing the pictures on the focusing plates through the eyepieces, the perspective feeling between the collimation patterns of the focusing plates and the three-dimensional image undergoes a change. The state where the three-dimensional image is seen on the same plane as the collimation patterns or is seen at the back of the collimation patterns, is the one of an optimum picture-masking factor for the stereo photography, and a numeral on the dial indicated by the fixed index at this moment teaches the number of the cover frame of an optimum picture-masking factor.

Figure 7:
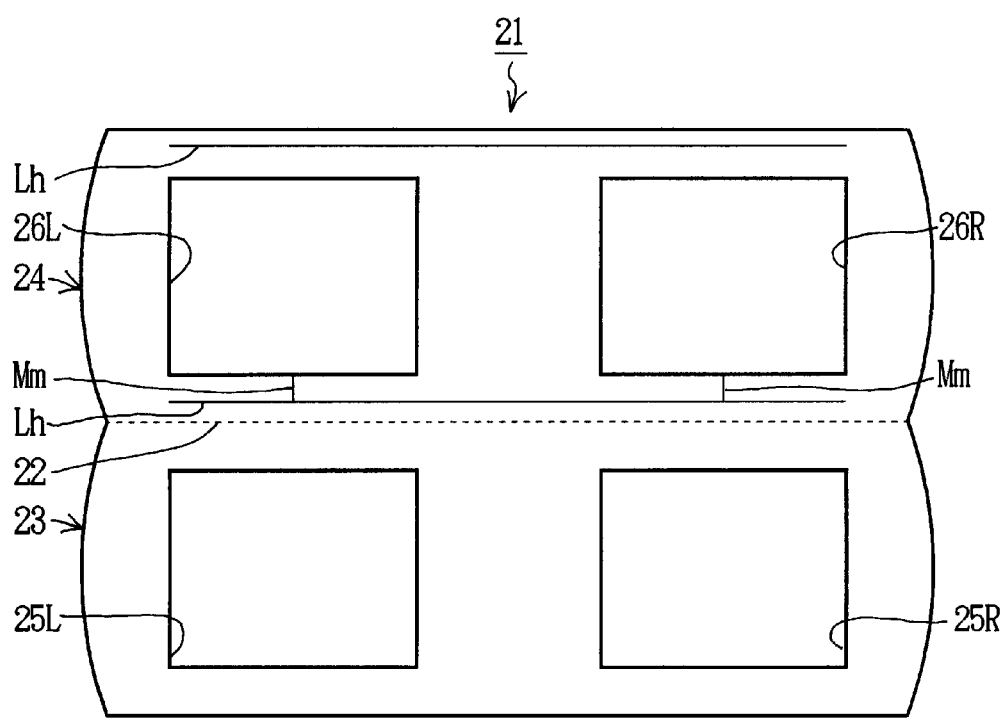
FIG. 7 is an expansion plan of a stereo slide mount made of a paper.

FIG. 7 illustrates a stereo slide mount system according to another embodiment. This slide mount 21 is obtained by punching a thick paper in a form symmetrical in the up-and-down direction and can be folded along a horizontal line 22 at vertical center position. The cover frame 23 of the upper half is folded to this side along the folding line 22 so as to be brought into contact with the base frame 24 of the lower half portion. Though not diagramed, the mount system is constituted by the slide mounts of plural kinds (#−3 to #−5) having stepwisely changing window widths like the above-mentioned stereo slide mounting system.

The right and left windows 25R, 25L, 26R, 26L are punched in the cover frame 23 and in the base frame 24. Horizontal reference lines Lh are printed on the upper and lower sides of the windows 26R, 26L of the base frame 24 for positioning the upper and lower edges of the reversal films. Positioning indexes Mm of vertical lines are printed downwardly from the centers of the lower horizontal reference line Lh.

A pair of films are adhered being positioned to the right and left windows of the base frame 24, and the cover frame 23 is folded and is adhered onto the base frame 24 to complete the stereo slide mount. With the above-mentioned pressure-sensitive adhesive agent being applied to the base frame 24, it is easy to adhere the films and to adhere the cover frame 23 and the base frame 24 together.

Figure 8A:
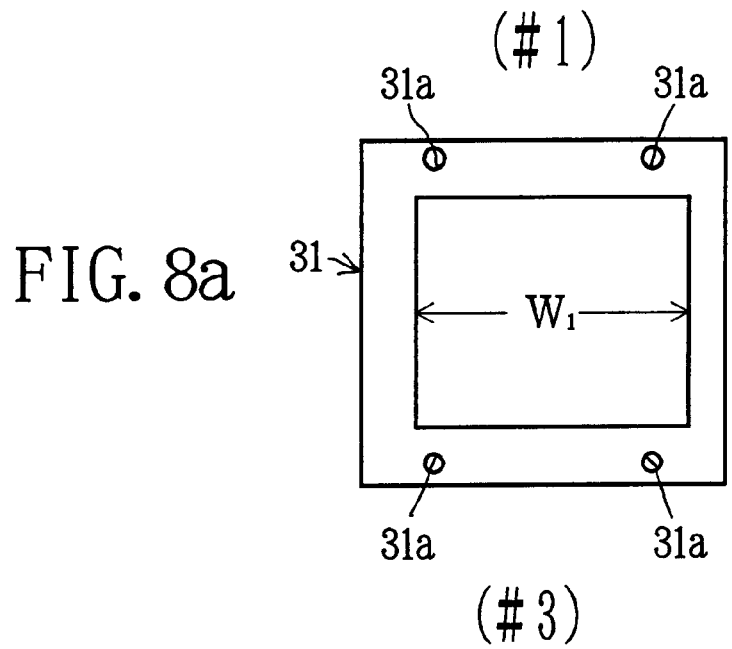
FIGS. 8a, 8b and 8c are front views of framing masks.
Figure 8B:
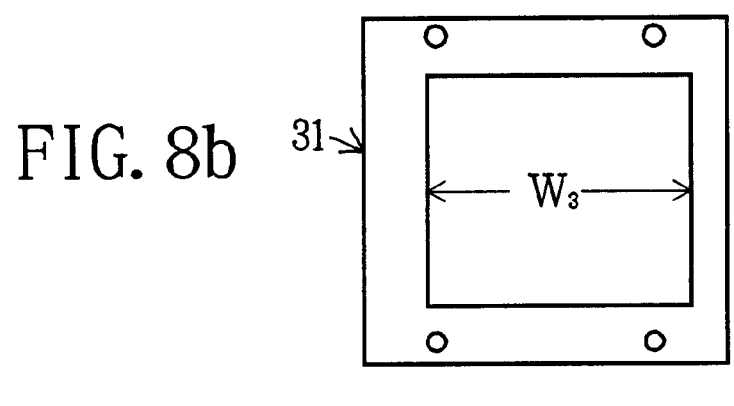
Figure 8C:
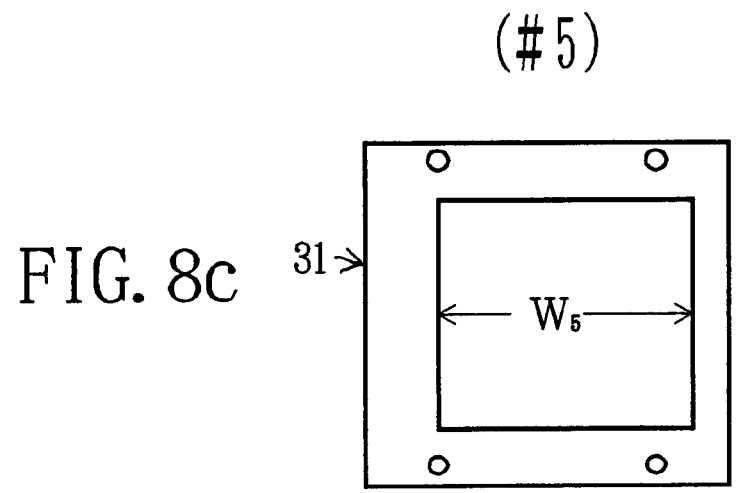

A mounting system in the stereo photographic system of another embodiment is constituted by the stereo slide mount shown in FIG. 3 and framing masks 31 (#1 to #5) shown in FIGS. 8a, 8b and 8c, and the amount for masking the pictures of the films is adjusted by the framing masks 31.

The framing mask 31 is formed by punching windows in a light-shielding material such as a paper or a black resin film. The vertical width of the framing mask 31 is larger than the width of the films, and holes 31a are formed at upper and lower portions at both the right and left ends so as to be engaged with the pins 15 erected on the base frame 11 shown in FIG. 3a. Like the above-mentioned cover frames 12, the framing masks 31 include those of plural kinds (#1 to #5) having window widths that change stepwisely. The windows of the framing masks 31 have sizes corresponding to the sizes of the windows in the cover frames 12 of various kinds shown in FIG. 5.

Figure 9:
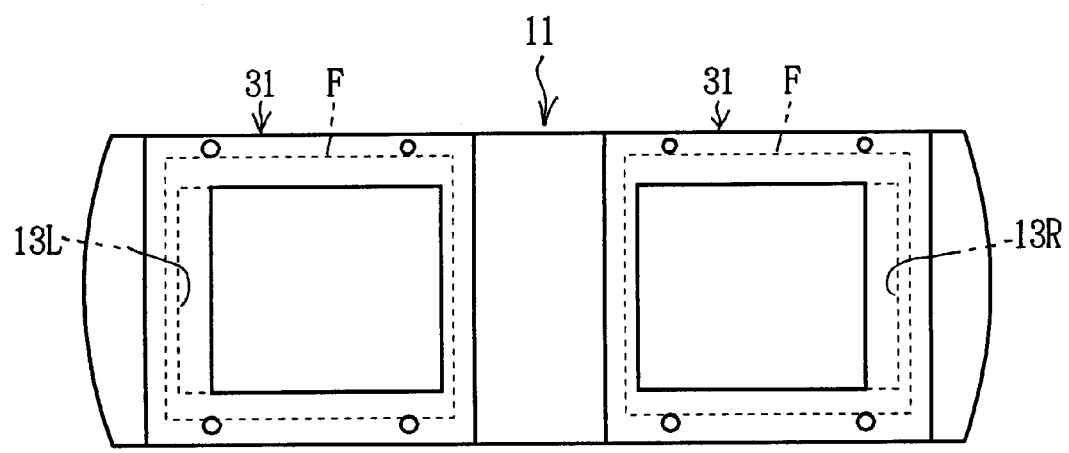
FIG. 9 is a front view illustrating a state where the framing masks are mounted on the base frame.

When the pictures are to be masked by the framing masks 31, the identification number of the framing masks 31 is read by detecting the masking amount by using the detecting device, and the framing masks 31 are positioned and placed on the films F so that the outer sides of the films F on the base frame 11 are concealed as shown in FIG. 9. When the cover frame 12 of #0 is mounted on the base frame 11, the films F and the framing masks 31 are held in a laminated state.

When the number of the detected masking amount is a minus number (#−1, #−2,- - - ), the framing mask of a plus number of which the absolute value is equal to the detected amount may be mounted being turned right side left. For example, when the detected masking amount is #−2, the framing mask of #2 is mounted being turned right side left to mask the inner sides of the pictures of the films, thereby to accomplish the masking amount of #−2.

Figure 10A:
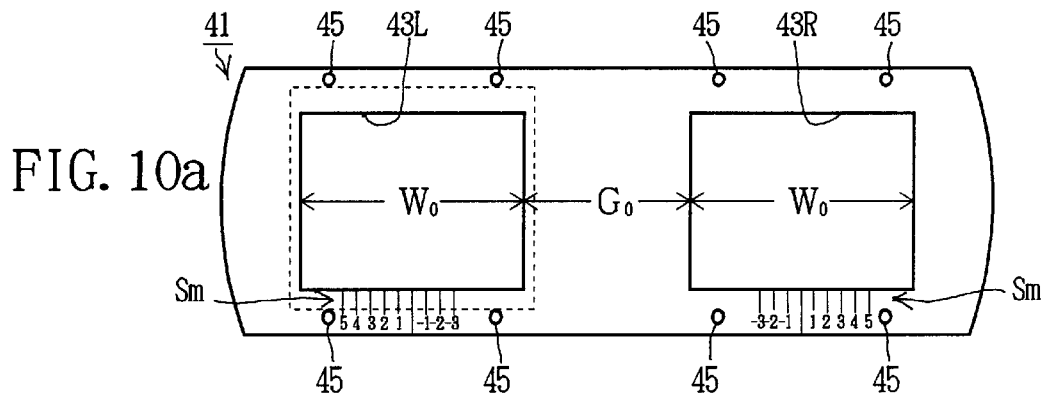
FIG. 10a is a front view of the base frame.
Figure 10B:
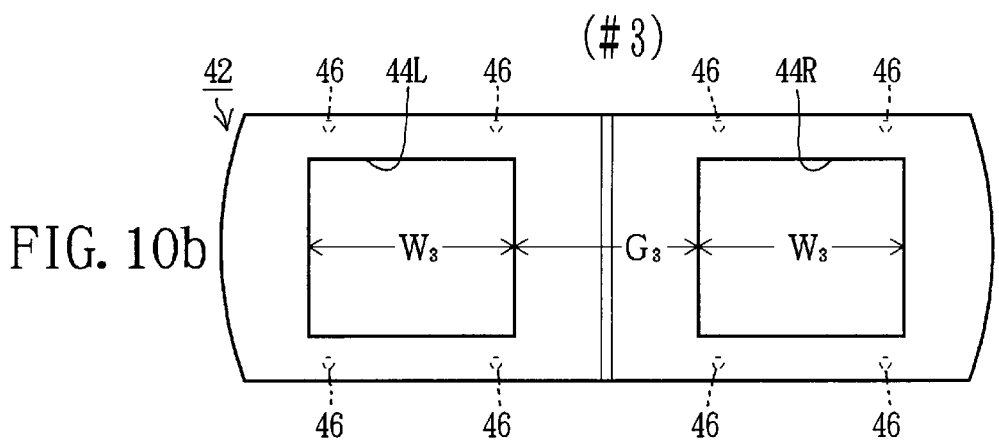
FIGS. 10b and 10c are front views of the cover frames.
Figure 10C:
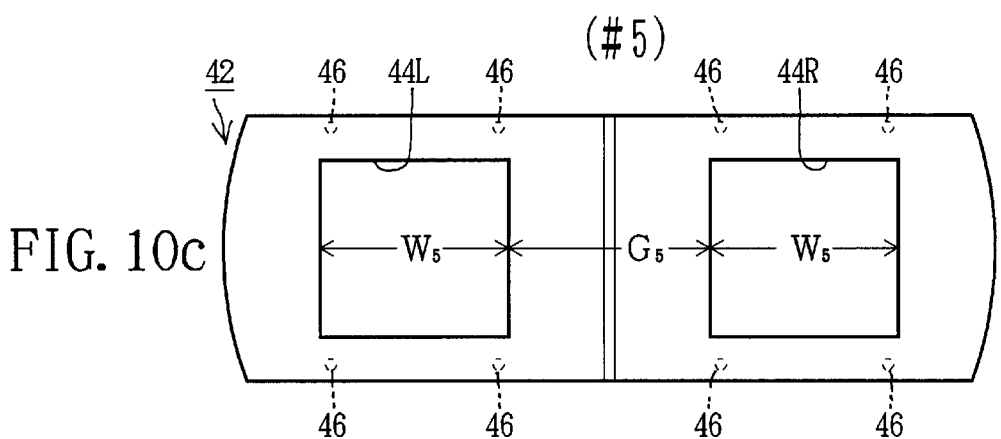

Next, described below is a mounting system in the stereo photographic system of another embodiment. FIG. 10*a* illustrates a base frame 41, and FIGS. 10*b* and 10*c* illustrate cover frames 42. The base frame 41 has a size equal to that of the base frame 11 shown in FIG. 3. Under the windows 43R and 43L, there are printed main scale graduates Sm of a vernier constituted by a plurality of vertical lines. In order to set constant the congestion angle of two eyes irrespective of the amount of masking the pictures, the cover frames 42 include those (#0 to #5) of plural kinds in which the pitch P between the windows 44R, 44L remains constant but the window width W changes stepwisely. The pins 45 on the base frame 41 and the pin holes 46 in the cover frame 42 are constituted in the same manner as those of the stereo slide mount of FIG. 3.

FIG. 10 illustrates the cover frames 42 of only two kinds (#3, #5). In all of the cover frames, however, the pitch P between the windows remains the same, the window width decreases stepwisely (W0, W1, - - - ) and the gap between the right and left windows increases stepwisely (G0, G1, - - -). When the gap G0 of the stereo slide mount 41 of #0 is based upon, the gap between the right and left windows maintains the following relationships:

(#0)G0
(#1)G1=G0+W0−W1
(#2)G2=G0+W0−W2
(#3)G3=G0+W0−W3

Figure 11:
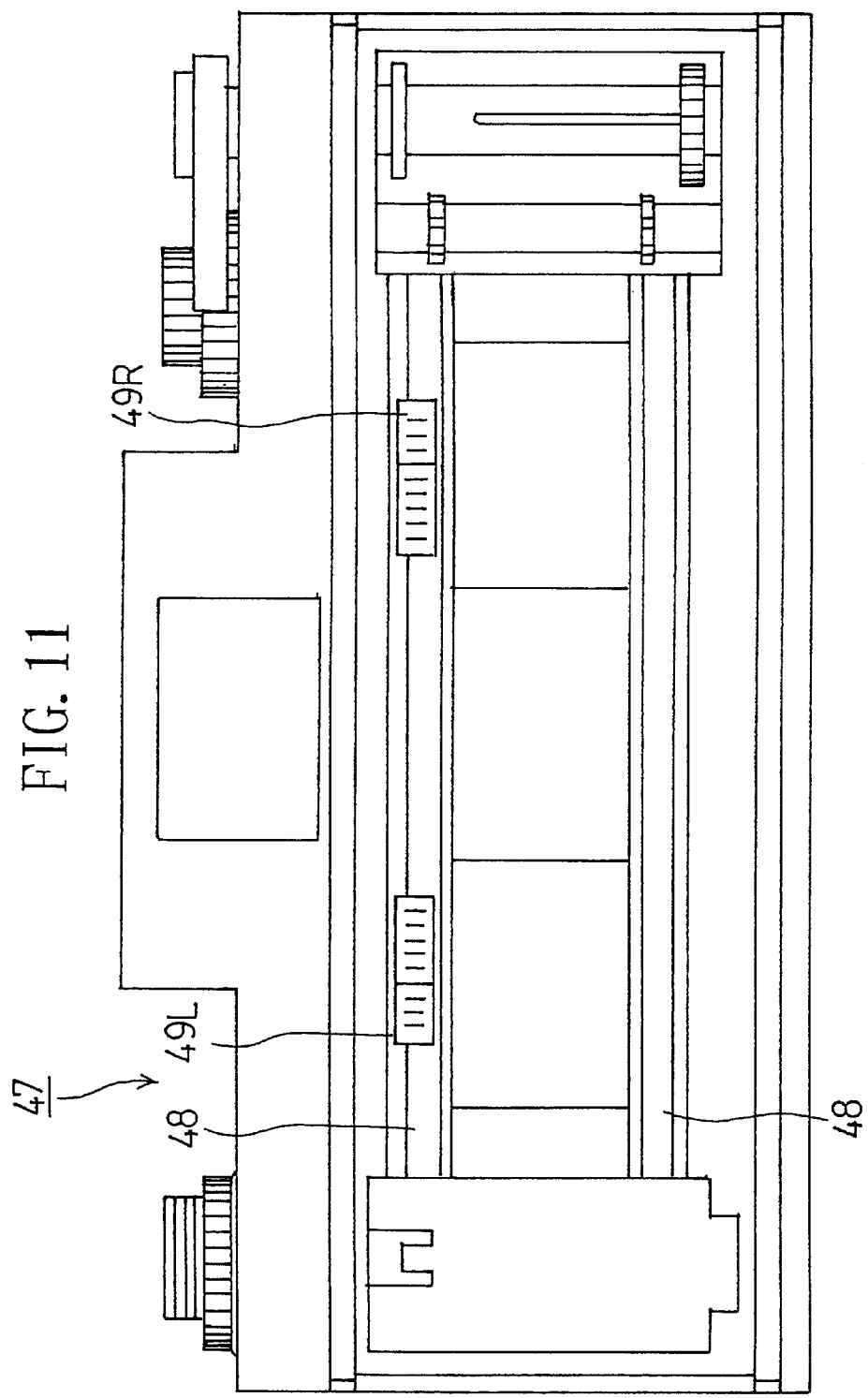
FIG. 11 is a back view of a stereo camera.
Figure 12:
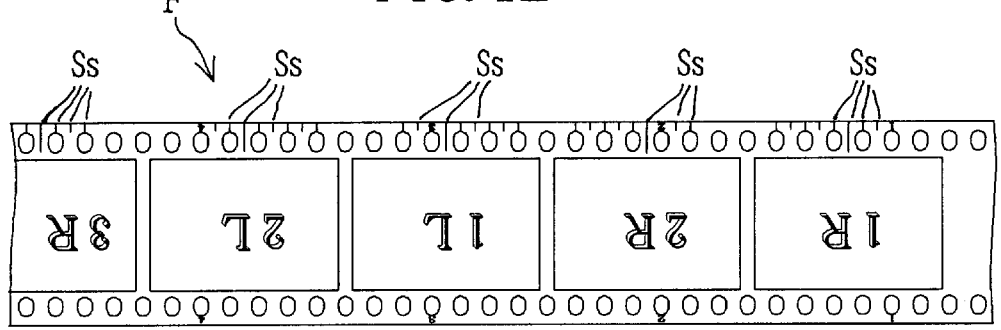
FIG. 12 is a front view of film strips photographed by using the stereo camera of FIG. 11.

FIG. 11 illustrates a stereo camera 47 of this stereo photographic system. The upper film guide 48 on the film running passage is provided with index-exposing devices 49R, 49L for exposing a plurality of vertical lines forming vernier graduates to light. FIG. 12 illustrates the film strips F photographed by using the stereo camera 47 of FIG. 11. The vernier graduates Ss are recorded on the upper side of the pictures 1R, 2R, 1L, 2L, - - -.

The numerals of the main scale graduates Sm on the base frame 41 and of the vernier graduates Ss recorded on the films F, are corresponding to the numerals of the dial of the testing device.

Figure 13A:
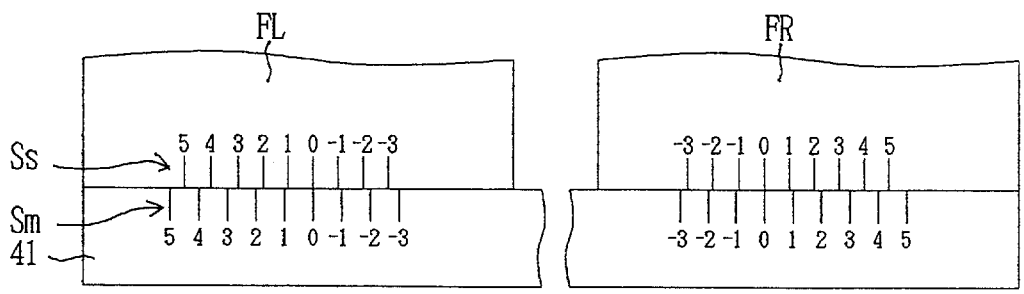
FIGS. 13a, 13b and 13c are diagrams illustrating base frames and vernier graduates.
Figure 13B:
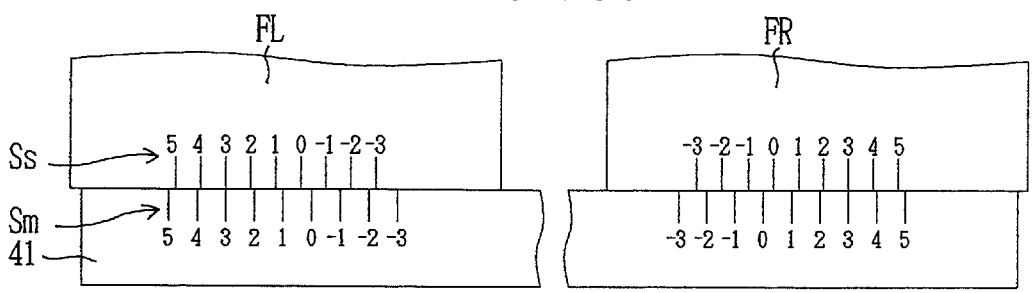
Figure 13C:
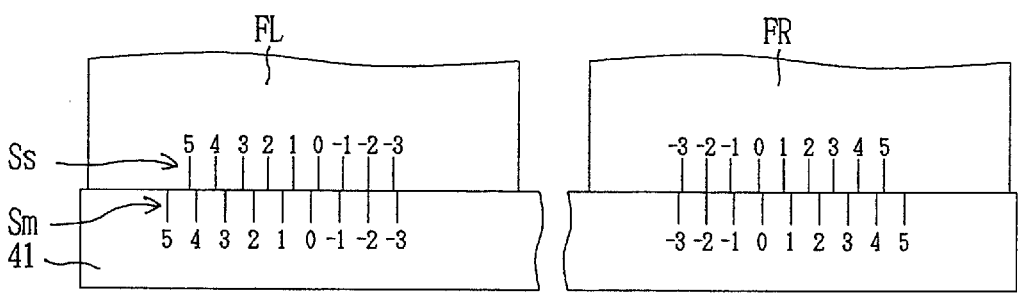

When the detected masking amount is 0 as shown in FIG. 13*a,* the offset amount of the film becomes 0 if the main scale graduate Sm which is 0 of the base frame 41 is brought into agreement with 0 on the vernier memory Ss of the films. Upon mounting the cover frame 42 of #0, therefore, there is completed a stereo slide mount of a masking amount of 0. FIG. 13*b* illustrates film positions of when the offset amount is #3. When the cover frame 42 of #3 is mounted, the inner edges of the pictures of the films are brought into agreement with the inner edges of the windows of the cover frame 42, and the masking amount becomes 0.3 mm on the outer sides of the pictures. Referring to FIG. 13*c,* when the cover frame 42 of #2 is mounted with the offset amount being #−2, the outer edges of the pictures of the films are brought into agreement with the outer edges of the windows of the cover frame 42, and the masking amount becomes 0.2 mm on the inner sides of the pictures.

Figure 14A:
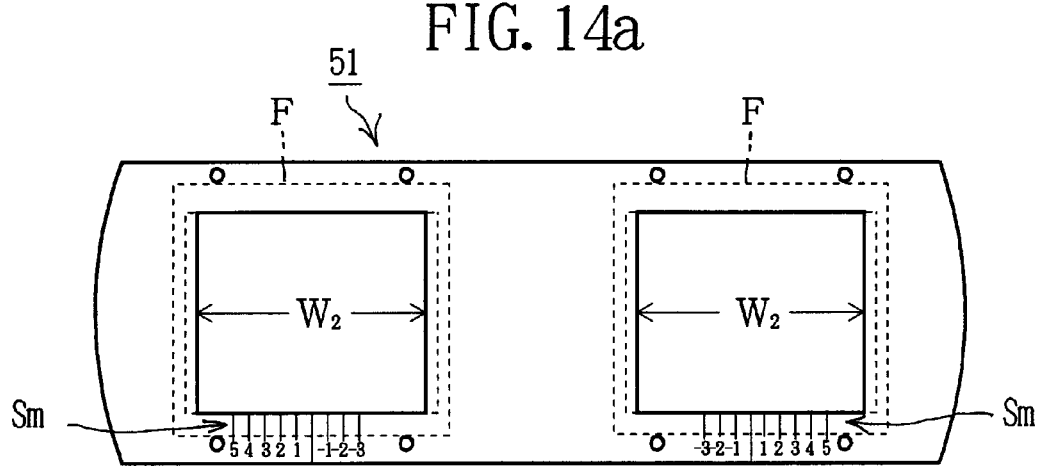
FIG. 14a is a front view of the base frame.
Figure 14B:
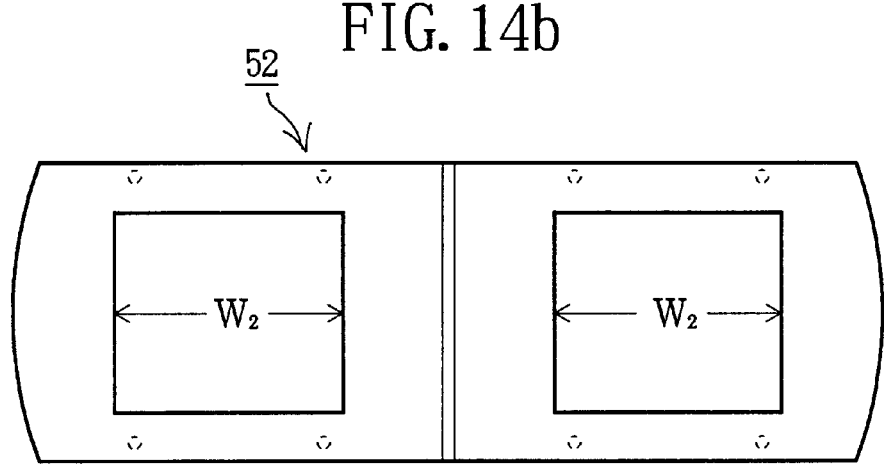
FIG. 14b is a front view of the cover frame.

FIG. 14*a*–*b* illustrates another embodiment of the stereo slide mount using the vernier, and in which use is made of a stereo slide mount of a single kind having a window width smaller than the picture width W0, the positions for mounting the films on the stereo slide mount are adjusted in the right-and-left direction, and the outer sides or inner sides of the pictures of the films are partly masked to correct the parallax.

Main graduates Sm are printed on the base frame 51 of FIG. 14*a*–*b* like the base frame 41 of FIG. 10, so that the films F on which the vernier graduates Ss are projected shown in FIG. 12 can be positioned. The window width of the base frame 51 and of the cover frame 52 is equal to, for example, the window width W2 of the cover frame #2 of FIG. 10, and is slightly narrower than the picture width of the films F. However, the window width of the base frame 51 may be the same as the picture width W0 of the films like that of the base frame 41 of FIG. 10*a*.

In the stereo slide mount of the vernier type, the detecting device for detecting the positions for mounting the films does not include the mechanism for adjusting the magnification of projection, and sets the magnification of projection constant, and adjusts the gap between the right and left projecting lenses or the gap between the focusing plates in a direction at right angles with the optical axis.

When the adjusting knob of the detecting device is turned from a position of an offset amount 0, the gap between the projecting lenses and the gap between the focusing plates change relative to each other, whereby the outer sides or the inner sides of the right and left projected images are deviated to lie outside the focusing plates, and there can be observed a three-dimensional image like that of when the outer sides or the inner sides of the right and left pictures are masked.

The adjusting knob is turned while observing the perspective view of the three-dimensional image for the collimation patterns of the focusing plates, so that the three-dimensional image can be seen on the same plane as the collimation patterns or at the back of the collimation patterns. At this moment, the numeral of the dial indicated by the fixed index tells the numeral of the vernier graduate with which the parallax is best corrected for the stereo photograph, in the same manner as that of the detecting device described above.

Next, described below is a stereo photographic system of another embodiment. This stereo photographic system is constituted by the stereo camera 1 shown in FIG. 1, a stereo slide mount (not shown) of a single kind having the same shape as the stereo slide mount of FIG. 14 but on which neither the main scale graduate nor the index is printed, a detecting device, and a printer for printing, onto the stereo slide mount, a positioning index corresponded to the film offset position detected by the detecting device.

Figure 15:
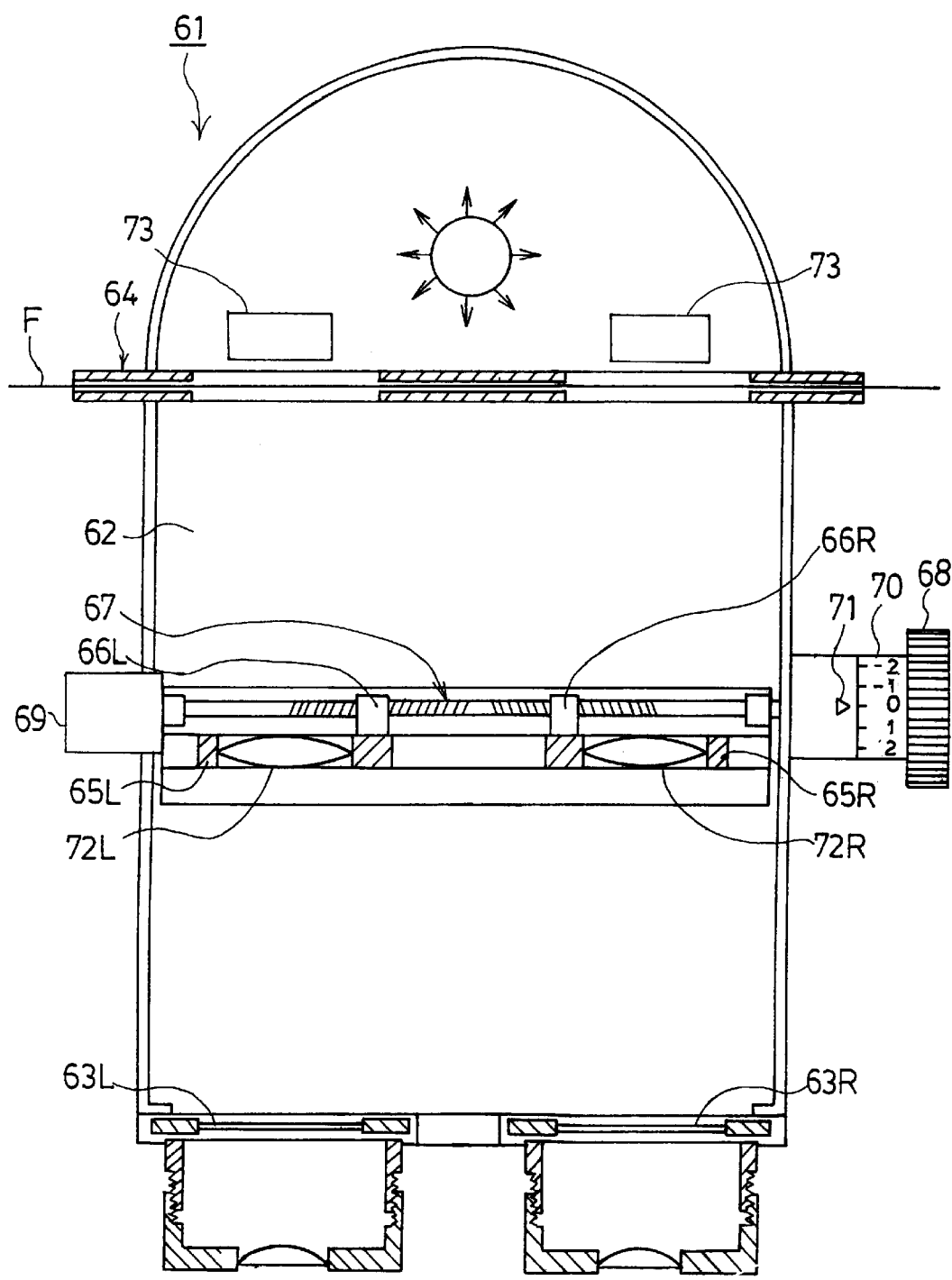
FIG. 15 is a plan view illustrating the structure of a testing device in a stereo photographic system.

FIG. 15 illustrates a detecting device 61 which is based upon a device that has been proposed already by the applicant of the present application, and outputs the data related to the offset amount of the projected images. Focusing plates 63R, 63L and a film guide 64 are secured onto the frame 62 of the detecting device 61, a screw bearing (not shown) is formed in each of the brackets 66R, 66L of the right and left separate projecting lens holders 65R, 65L, and a feed screw 67 in the right-and-left direction provided for the frame 62 and the screw bearings of the right and left projection lens holders 65R, 65L are coupled together by a ball screw mechanism.

The feed screw 67 is threaded to form a right hand screw and a left hand screw symmetrically in the right-and-left direction from an intermediate portion. When an adjusting knob 68 at the end of the feed screw 67 is turned clockwise, the right and left projecting lens holders 65R, 65L separate away from each other in the direction at right angles with the optical axis. When the adjusting knob 68 is turned counterclockwise, the right and left projecting lens holders 65R and 65L approach each other in the direction at right angles with the optical axis.

A rotational position detector 69 such as a potentiometer or a resolver is coupled to the end of the feed screw 67, and the data related to the rotational position of the screw 67 is input to the control unit (not shown).

When the magnification of projection is r and the width of the pictures of the films is w, then, the width of the focusing plates 63R, 63L, is given as r ×w. Numerals (−3 to 5) corresponding to the mount numbers (#−3 to #5) of the stereo slide mount system are engraved on the dial 70 in concentric with the adjusting knob 68. When the numeral 0 of the dial 70 is brought into agreement with the fixed index 71, the principal points of the projecting lenses 72R, 72L are located on the straight lines connecting the centers of the right and left pictures of the film strips F loaded on the film guide 64 and the centers of the focusing plates 63R, 63L.

As the dial 70 is turned in the plus direction from 0, the gap increases between the right and left projecting lenses 72R and 72L, the projected pictures are offset toward the outer side, and the outer regions of the pictures are deviated toward the outer side of the focusing plates 63R and 63L. Conversely, when the dial 70 is turned in the minus direction from 0, the gap decreases between the right and left projecting lenses 72R and 72L, the projected pictures are offset toward the inner side, the inner regions of the projected pictures go excessively toward the inner sides of the focusing plates 63R, 63L, making it possible to observe the image in a state where the parallax is corrected. As the offset position-detecting means, there may be employed a directly moving-type position detector such as a magnetic scale or an Inductocin instead of the rotational position detector 69, in order to directly detect the positions of the right and left projection lens holders 65R and 65L.

Laser beam emitters 73 are provided on the back surface of the film guide 64 to describe a frame number on the regions outside the pictures of the films. It is not easy by using a thermal printer or an ink-jet printer to describe the frame number on the black unexposed portion of the reversal film that has been developed. When a laser beam is projected onto the emulsion surface of the films by using a laser beam emitter, however, the film base is heated, the arrangement of the pigment particles on that portion is destroyed enabling the film base to be seen through, and even fine characters can be precisely recorded offering a favorable result.

Then, the adjusting knob 68 is operated to obtain a state where the parallax is properly corrected. Upon depressing Execute Key (not shown) on the operation panel, therefore, the data related to the offset amount based upon the rotational position of the feed screw 67 and the frame number are input to a memory in a control unit and, at the same time, the laser beam emitters 73 operate to record the frame numbers (nR, nL) on the lower edge of the right and left films F. The operation for detecting the offset amount can be efficiently carried out if a film feeder is provided to feed stereo pictures of film strips set by set and if the laser beam emitters 73 record the film numbers (nR, nL) in an increasing order being interlocked to the feeding of the films, though not diagramed.

Figure 16:
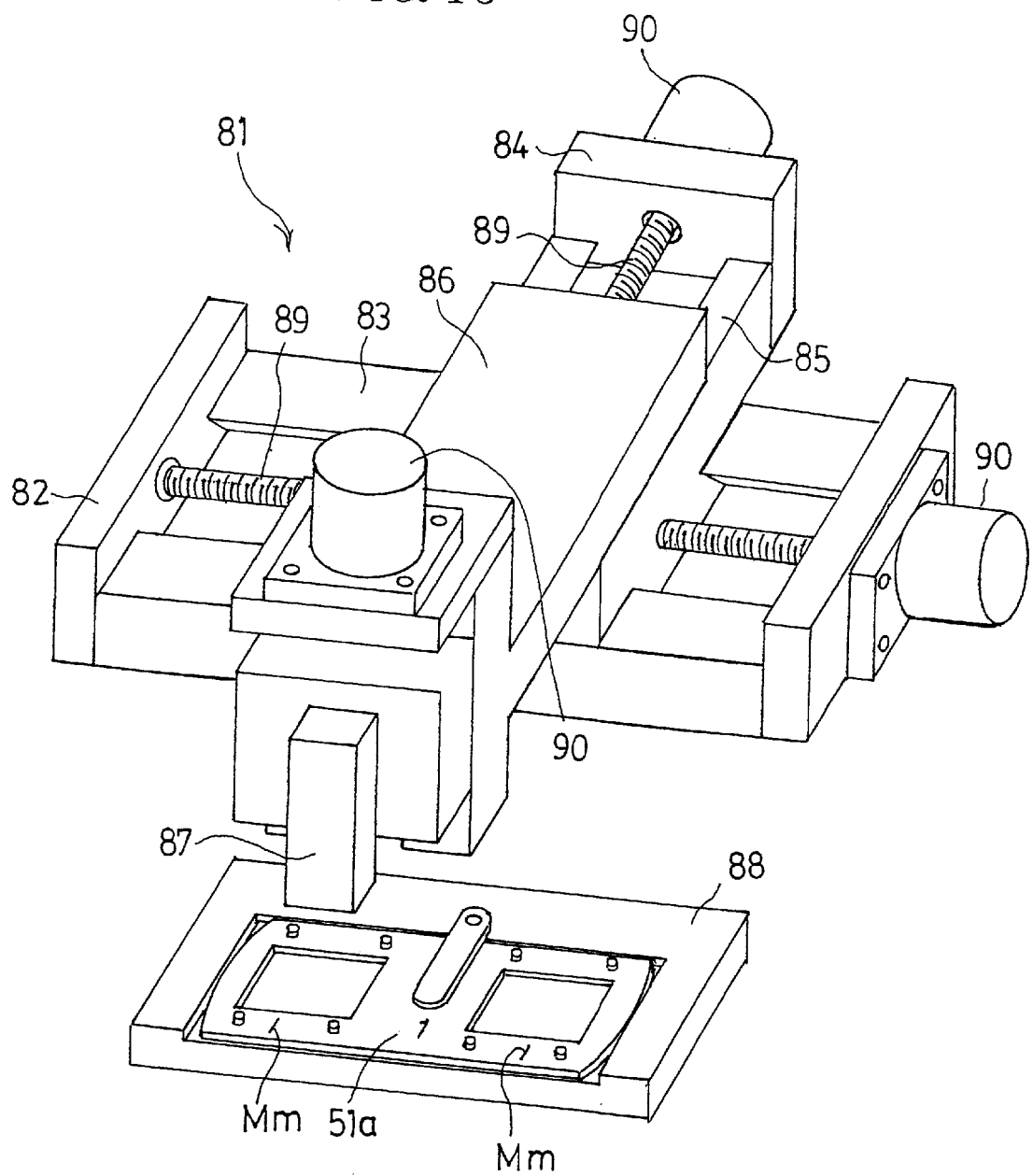
FIG. 16 is a perspective view of a printer in the stereo photographic system.

FIG. 16 illustrates a printer 81 used in combination with the detecting device 61. A Y-carriage 84 is engaged with a Y-rail 83 secured to the base 82, and an X-carriage 86 is engaged with an X-rail 85 formed on the upper surface of the Y-carriage 84. On the X-carriage 86 is mounted an ink-jet printer head 87 so as to be moved up and down in the Z-direction, and a mount holder 88 secured to the base 82 is positioned under the printer head 87.

There is no particular limitation on the mechanisms for feeding the Y-carriage 84, X-carriage 86 and printer head 87, and any feeding mechanism can be used. For example, the feeding mechanism is constituted by a ball screw 89 and a servo motor 90, and a printer control unit (not shown) drives the servo motor 90 to control the printer head 87 on the three-dimensional coordinates.

A base frame 51a of a stereo slide mount on which no graduate or index is printed is mounted on the mount holder 88, and a print execution instruction is input. Then, the printer control unit reads the data related to the offset position from a data processing unit of the detecting device 61, drives the printer head 87 in the X-, Y- and Z-directions to print an index at positions under the windows of the base frame 51a based on the data related to the offset position, and prints the frame numbers at the center of the base frame 51a or around the windows.

Films corresponding to the film numbers printed on the base frame are mounted on the base frame 51a, indexes of the films are brought into agreement with the indexes of the base frame 51a, and the cover frame 52 is mounted to complete a stereo slide mount having a suitable film offset amount.

A number of data can be stored in the detecting device and in the printer. After the index marking positions of a single film or of a plurality of films have been detected, the step for printing indexes on a number of base frames can be continuously executed as a matter of course.

Figure 18:
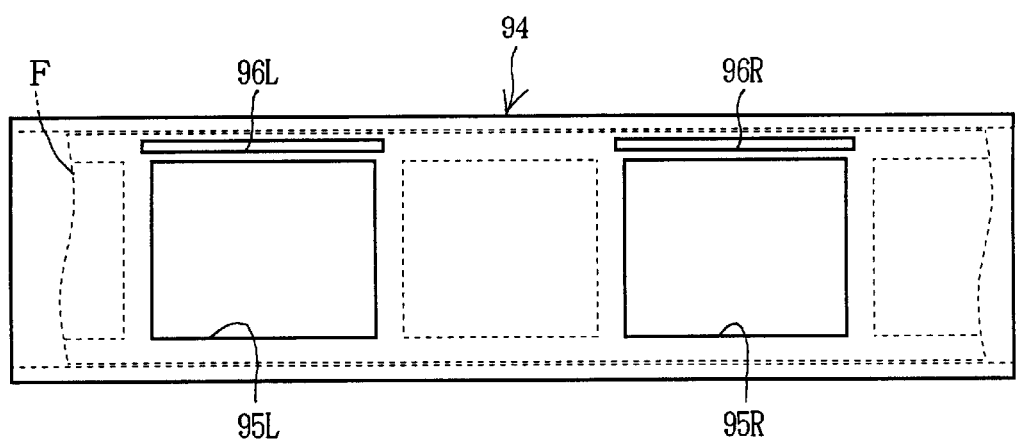
FIG. 18 is a front view illustrating a portion of a film guide in the testing device.

Next, described below is a stereo photographic system of another embodiment. This stereo photographic system uses the stereo slide mount same as the stereo photographic system in a prior embodiment. The optical system of the detecting device is the same as that of the detecting device 61 shown in FIG. 15. Instead of the rotary position detector 69 for detecting the positions of the projecting lenses or of the focusing plates, however, the film offset position-detecting means is constituted, as shown in FIG. 17, by image sensors 93R, 93L (CCD image sensors or light spot detectors (PSD) utilizing photo-diodes) arranged in the right-and-left direction under the focusing plates 92R, 92L of the detecting device 91 and, as shown in FIG. 18, by slits 96R, 96L opposed to the image sensors 93R, 93L of the focusing plates 92R, 92L, the slits 96R, 96L being formed over the windows 95R, 95L of the film guide 94 of the detecting device 91.

The indexes of the films loaded on the film guide 94 are exposed in the slits 96R, 96L and are projected onto the image sensors 93R, 93L of the focusing plates 92R, 92L. The light-receiving surfaces of the image sensors 93R, 93L are in flush with the light-receiving surfaces of the focusing plates 92R, 92L to correctly detect the positions of the indexes Mf of the films.

When the adjusting knob of the detecting device 91 is operated in the same manner as the detecting device 61 shown in FIG. 15, the images on the focusing plates 92R, 92L as well as indexes of the films move relative to each other in the right-and-left direction. The positional relationship between the focusing plates 92R, 92L and the projected indexes is equal to the positional relationship between the windows and the indexes of the films of when the films are mounted on a stereo slide mount of a single kind having a window width smaller than the picture width of the films. The offset is suitably adjusted while observing the images on the focusing plates 92R, 92L and the positions of indexes on the films are detected by the image sensors 93R, 93L to obtain data related to the positions of indexes that are to be printed on the base frame 51a of the stereo slide mount.

The data related to the positions of indexes are input to the printer 81 to print the indexes onto the base frame 51a, and the films are mounted while bringing the indexes Mm of the base frame 51a into agreement with the indexes Mf of the films, in order to reproduce picture offset state observed by the detecting device 91 by using the stereo slide mount. When the lateral width of the focusing plates 92R, 92L is not the same as the lateral width of the windows of the stereo slide mount, the Y-coordinates at the index-printing positions may be corrected depending upon the ratio of the sizes.

As described above, the positions of indexes on the films are detected on the practically projected pictures, and indexes at positions same as the positions of indexes of the films are printed on the stereo slide mount. Therefore, the positions of indexes on the films need not necessarily be set constant. Instead of projecting the indexes onto the films at the time of photographing, therefore, latent images of indexes may have been formed in advance in the step of manufacturing films, and indexes that appear after the developing may be utilized. Moreover, the film guide 94 of the detecting device 91 may be equipped with laser beam emitting devices in order to mark the indexes Mf on the upper portions of the films prior to conducting the detection.

When the films have been perforated like the 135-type film, the perforations can be utilized as positioning indexes in addition to utilizing the indexes recorded on the films, in order to detect the offset amount.

When the perforations are to be used as indexes for positioning, the perforated portions of the films are exposed to the slits 96R, 96L of the film guide 94 shown in FIG. 18, projected onto the image sensors 93R, 93L provided under the focusing plates 92R, 92L, and are scanned in the horizontal direction by the image sensors 93R, 93L.

Figure 19A:
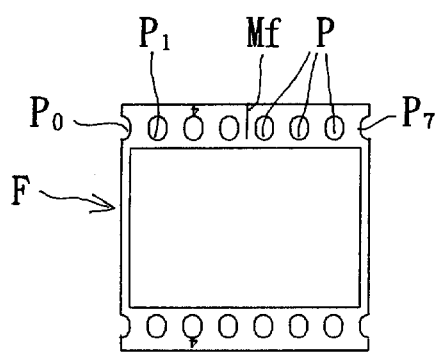
FIGS. 19a and 19b are front views of films cut into frames.
Figure 19B:
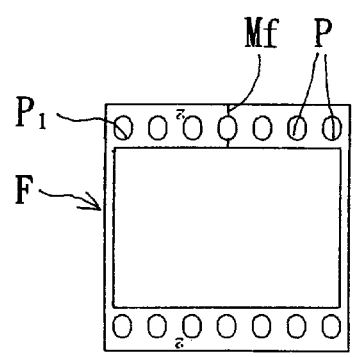

When, for example, the perforated portions are scanned from the outer sides of the outer vertical frames of the right and left focusing plates 92R, 92L, the outputs of the image sensors 93R, 93L are of a while level at the time of starting the scanning. Despite the film F is cut at a position of a perforation P as shown in FIG. 19a or is cut between the perforations P as shown in FIG. 19b, therefore, the output changes into the black level at a black portion between the perforations P.

The output changes into the white level when the position of a first complete perforation P1 is reached after having passed through the gap between the perforations, and the data related to the position is stored upon detecting this position. That is, the position of the outer edge of the first complete perforation P1 from the starting point of scanning is detected and based on this data of position, an index is printed on the mount by the printer 81.

When the film feeding mechanism of the stereo camera is so constituted that the pitch between the pictures of the stereo photograph is an integer times of the pitch between the perforations and that the gap between the pictures on the film strips is arranged at the positions of the perforations, the films F are cut frame by frame at a position of the perforation P. Therefore, the positions where the white level changes into the black level after the start of scanning by the image sensors 93R, 93L may be detected, i.e., the positions of inner edges of the perforations P0, P7 cut at both ends of the films may be detected, to use them as data for printing the indexes.

Figure 20A:
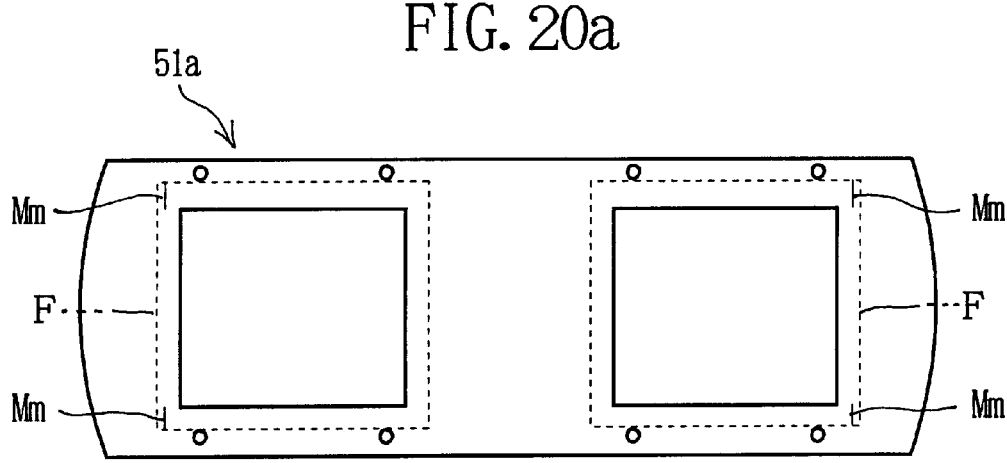
FIGS. 20a, 20b and 20c are front views of the base frames on which indexes are printed.
Figure 20B:
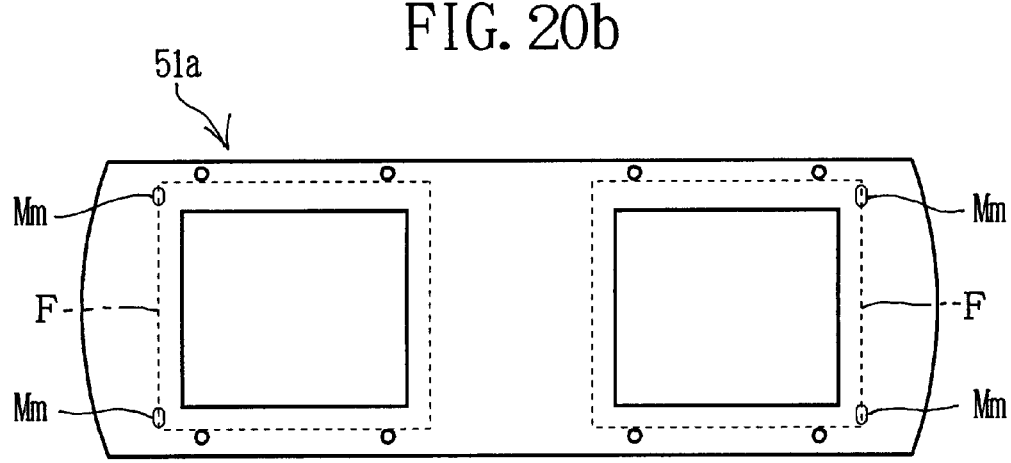
Figure 20C:
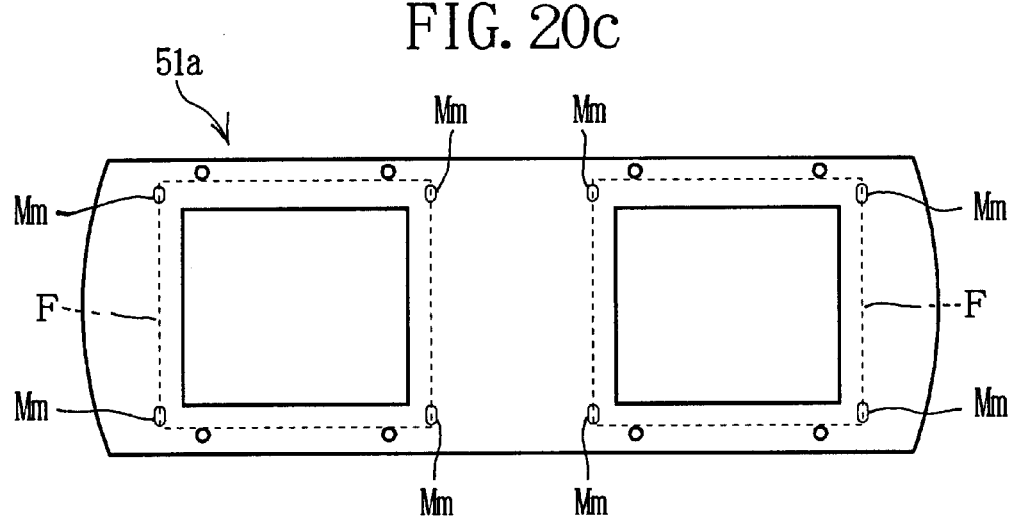

FIG. 20 illustrates an example of printing indexes that correspond to the perforations of the films. The shape of the index Mm may be a vertical line at the edge of the perforation as shown in FIG. 20a. Or, a template of a square mark of the same shape as the perforation may be stored in a drawing memory of the printer 81, and indexes Mm of the shape of a perforation may be printed as shown in FIG. 20b. Otherwise, the whole width of the films may be scanned by the image sensors 93R, 93L to detect the positions of perforations at both the right and left ends of the films, and indexes Mm corresponding to the perforations at both the right and left ends of the films may be printed.

In the currently used films, markings such as frame numbers have been projected to the upper and lower edge portions of the films. Therefore, the one-dimensional line sensor may not often be able to distinguish the frame numbers over the perforations. When the two-dimensional image patterns scanned by the two-dimensional area sensor along the perforations are analyzed by the pattern recognition unit to distinguish the pattern of perforations over other patterns such as of markings, then, the above-mentioned confusion does not occur.

Described below is a stereo photographic system of another embodiment. In this stereo photographic system, use a thermoplastic resin stereo slide mount having a window width of a single kind, and forming the protuberances on the base frame of the stereo slide mount for positioning the films in the right-and-left direction.

Figure 21A:
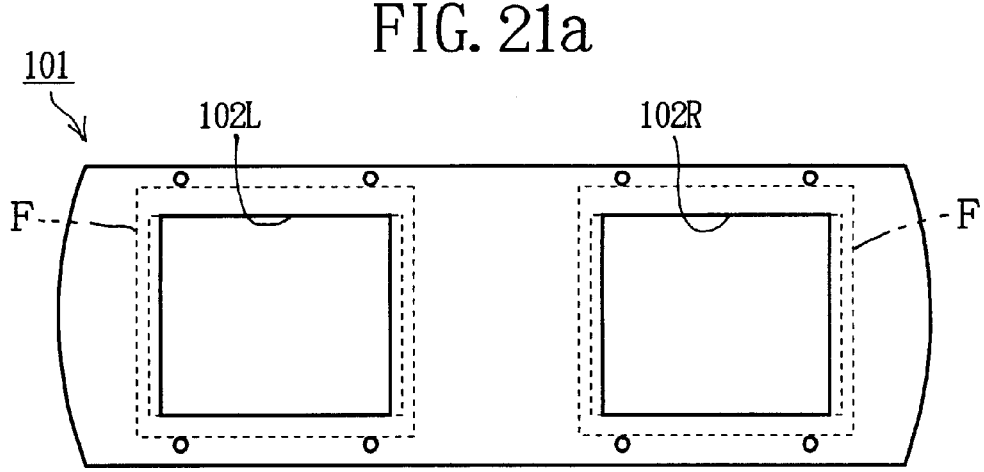
FIG. 21a is a front view of the base frame.
Figure 21B:
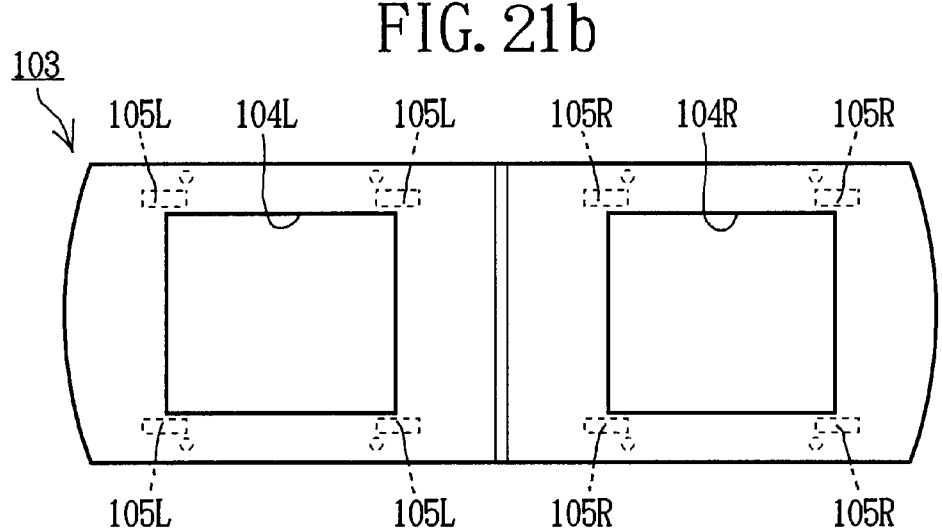
FIG. 21b is a front view of the cover frame.

Referring to FIG. 21, the stereo slide mount has the same shape as the one shown in FIG. 14, but the base frame 101 has neither graduate nor index. Protuberances are formed by a protuberance-forming device that will be described later at four corners of the windows 102R, 102L of the base frame 101 for engagement with the perforations of the films. Therefore, recesses 105R, 105L are formed on the back surface (that comes into contact with the base frame) at four corners of the windows 104R, 104L of the cover frame 103 to avoid interference with the protuberances.

Figure 22:
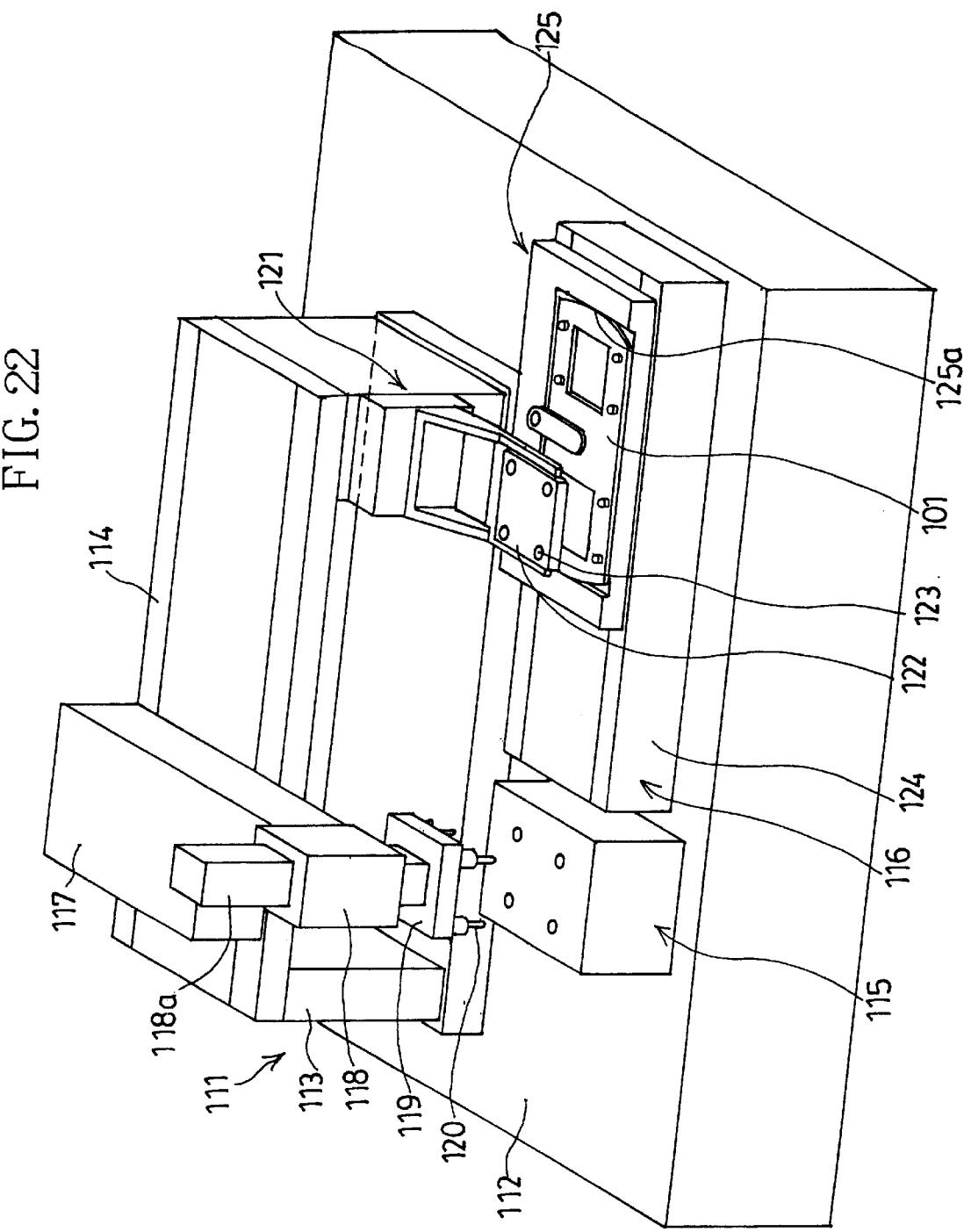
FIG. 22 is a perspective view of a protuberance-forming device.

FIG. 22 illustrates a projection-forming device 111 in which a Y-rail 114 is secured onto a gate-shaped frame 113 provided on a base 112, an electromagnetic induction heater 115 is arranged on the front left side of the gate-shaped frame 113, and a mount feeding device 116 is arranged on the front right side of the gate-shaped frame 113.

A plunger carriage 117 is mounted on the Y-rail 114, a Z-axis actuator 118 is attached to the front portion of the plunger carriage 117 that is driven by a linear servo motor (not shown), and a plunger holder 119 is attached to the lower end of a ram 118a of the Z-axis actuator 118.

Four round rod-type heat plungers 120 are attached to the lower surface of the plunger holder 119. A pitch of the heat plungers 120 in the X-axis direction (up-and-down direction in the drawing) is equal to the pitch between the upper and lower perforations of the 135-type film, and a pitch thereof in the Y-axis direction (right-and-left direction in the drawing) is slightly larger than the pitch between the perforations at both the right and left ends of the film cut into a frame.

Figure 23A:
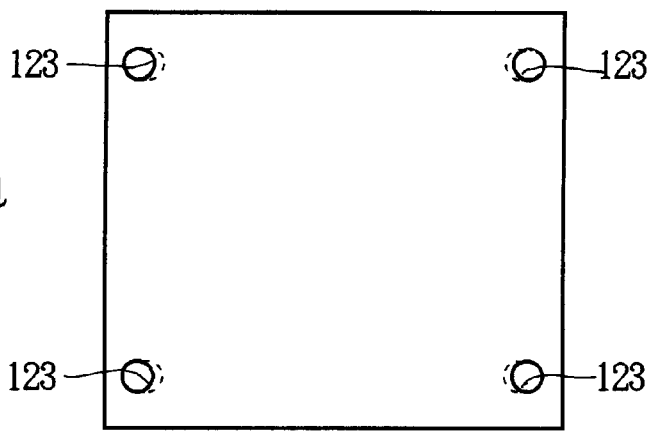
FIG. 23a is a plan view.
Figure 23B:
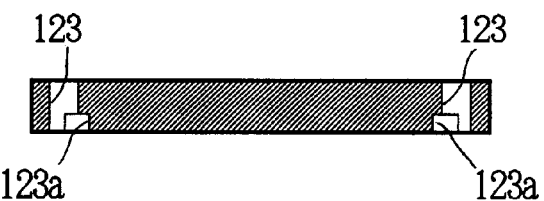
FIG. 23b is a side sectional view.
Figure 23C:
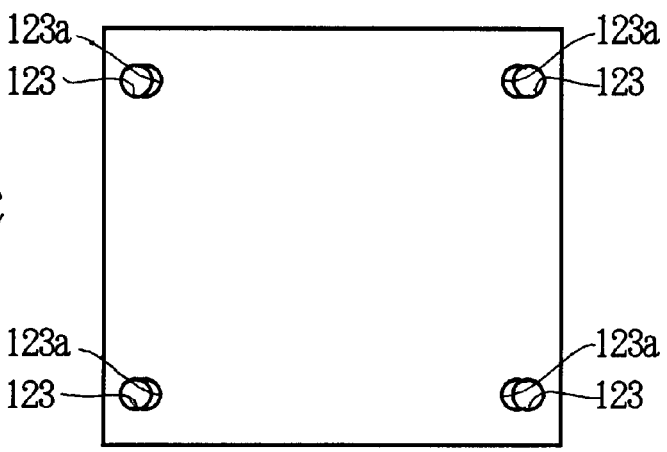
FIG. 23c is a bottom view.

A die plate elevation unit 121 is attached to the right end of the gate-shaped frame 113, and a die plate 122 is attached to the die plate elevation unit 121. In the die plate 122 are formed holes 123 at four places corresponding to the four heat plungers 120 of the plunger holder 119. Referring to FIG. 23, in the lower surface of the die plate 122 are formed circular recessed portions 123a that are deflected from the holes 123 toward the lateral center of the die plate 122. The gap between the outer peripheral surfaces of the right and left recessed portions 123a is equal to the gap between the perforations at both the right and left ends of the film that is cut into a frame. In order to prevent a change in the size caused by a temperature change, it is desired that the plunger holder 119 and the die plate 122 are made of a material having a small coefficient of expansion, and the heat plunger 120 is mounted on the plunger holder 119 via a heat-insulating support member.

The mount feeding device 116 has a mount carriage 125 mounted on a Y-rail 124 on the upper surface thereof. The mount carriage 125 is slid by a linear servo motor (not shown), and a control unit (not shown) controls the Y-coordinate of the mount carriage 125 relying upon the position data from the detecting device 91. A mount holder portion 125a is provided on the upper surface of the mount carriage 125, and the base frame 101 of the stereo slide mount is loaded and secured on the mount holder portion 125a.

When the plunger carriage 117 is moved to the left end of the movable range to lower the plunger holder 119, the four heat plungers 120 are inserted in the holes at four places in the upper surface of the electromagnetic induction heater 115 and are heated by electromagnetic induction. Furthermore, the plunger carriage 117 is moved toward the right, and the feeding amount is so controlled that the four heat plungers 120 of the plunger holder 119 are halted at a position in agreement with the holes 123 at four places of the die plate 122. After halted, the plunger holder 119 is lowered, so that the ends of the heat plungers 120 are inserted in the holes 123 of the die plate 122.

The protuberance-forming device 111 is controlled for its series of operations by the controller, and forms protuberances on the base frame 101 based upon the position data of perforations at both right and left ends of the films detected by the detecting device 91.

The operations will now be described. First, the base frame 101 of the stereo slide mount is mounted on the mount holder portion 125a of the mount carriage 125, and a working execution instruction is input Then, the position data of perforations are transferred from the detecting device 91 to the protuberance-forming device 111, the plunger holder 119 of the plunger carriage 117 at the left end is lowered, and the heat plungers 120 are inserted in the holes of the electromagnetic induction heater 115 and are heated. At the same time, the control unit drives the mount carriage 125 based upon the position data of perforations, so that relative positions of the holes 123 of the upper die plate 122 and of the left window 102L of the base frame 101 are in agreement with the relative positions of the left picture and of the perforations detected by the detecting device 91.

Then, the die plate elevation unit 121 lowers the die plate 122 so as to come into intimate contact with the left window 102L of the base frame 101. The die plate 122 is then positioned and secured at a correct working position of the left window 102L of the base frame 101. Then, the heated plungers 120 are raised from the electromagnetic induction heating device 115, the plunger carriage 117 is moved toward the right and is halted at a position same as the die plate 122. Thereafter, the plunger holder 119 is lowered to insert the heat plungers 120 in the holes 123 of the die plate 122 so as to come in contact with the base frame 101.

Figure 24:
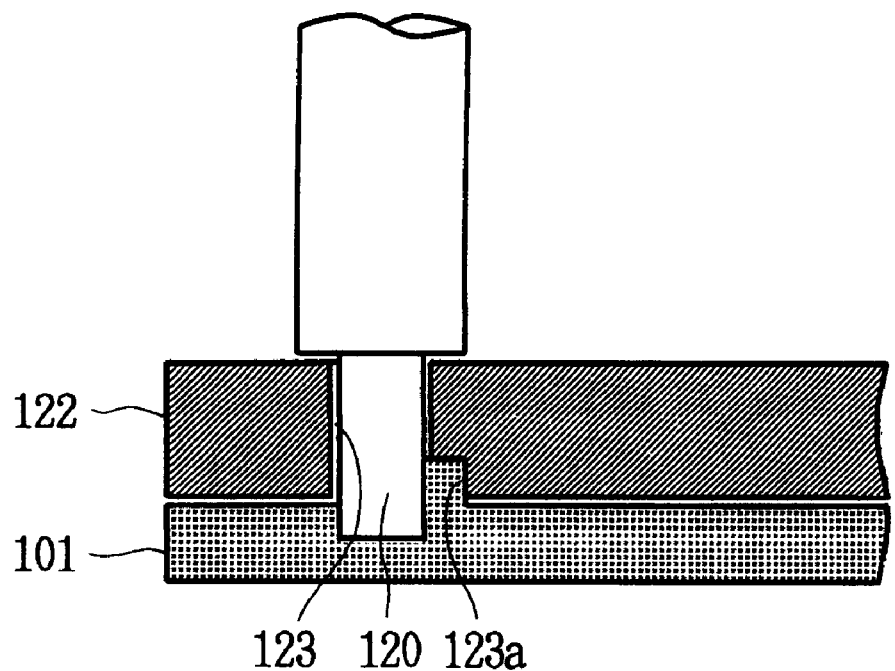
FIG. 24 is a sectional view illustrating a step for forming a protuberance on the base frame.
Figure 25:
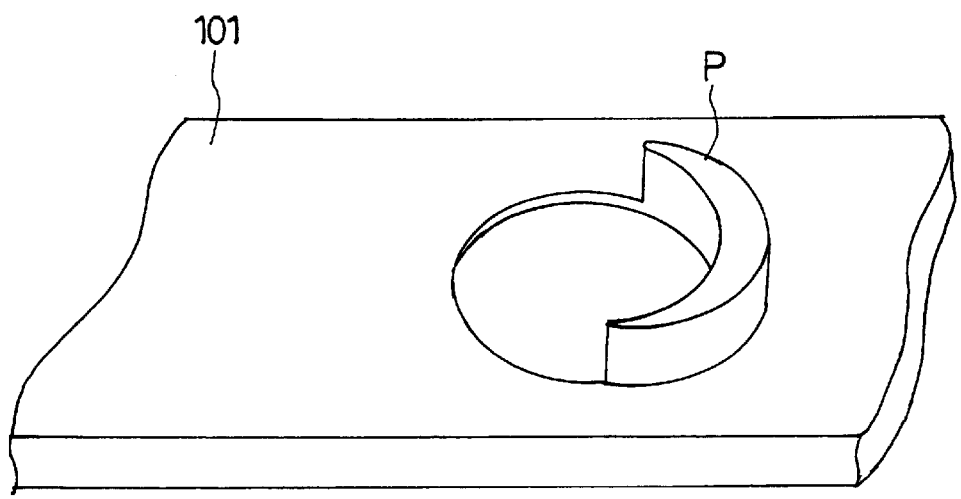
FIG. 25 is a perspective view illustrating the shape of the protuberance.

Thus, as shown in FIG. 24, the portions of the base frame 101 in contact with the heat plungers 120 are melted, and the molten resin flows into the recessed portions 123a in the die plate 122. As the plunger holder 119 is raised, the molten resin is robbed of heat by the die plate 122 and solidifies to form crescent protuberances P as shown in FIG. 25.

Then, the die plate 122 is raised, and the mount carriage 125 is moved, so that the four points at where the protuberances of the right window 102R of the base frame 101 are to be formed are in agreement with the holes 123 in the upper die plate 122. The die plate 122 is then lowered and is brought into pressed contact with the base frame 101, and the plunger holder 119 is lowered to form protuberances P at four places surrounding the right window 102R of the base frame 101 in the same manner as the left window.

Though not diagramed, it is convenient if a printer such as an ink-jet printer is arranged near the mount feeding device 116 to print the frame numbers on the base frame 101 simultaneously with the step of forming protuberances.

The films are mounted on the base frame 101 on which the protuberances P are formed in a manner as described below. That is, the films are placed on the positions of the windows in the base frame 101, perforations are engaged with the four protuberances P around the window of the base frame 101, and the cover frame 103 is fitted to the base frame 101, so that the films are mounted in a state where the offset amount of the pictures on the films is relatively equal to the offset amount detected by the detecting device 91.

According to the stereo photographic systems of several embodiments as described above, indexes are formed on the films and on the stereo slide mount. Therefore, the films are easily mounted in position and correctly.

According to the stereo photographic systems of other embodiments, the films and the stereo slide mount are graduated to constitute a vernier graduate. Therefore, there is provided a system for correcting the parallax by adjusting the offset amount of the films relative to the windows of the stereo slide mount, making it possible to correctly adjust the offset amount.

According to the stereo photographic systems of yet other embodiments, indexes or protuberances are formed on the stereo slide mount for properly positioning the pictures of the films relative to the windows of the stereo slide mount. Therefore, any stereo photograph can be coped with by the stereo slide mount of the single kind, and an ideal system can be constituted without using stereo slide mounts of many kinds.

The present invention is in no way limited to the above-mentioned embodiments only but can be modified in a variety of other ways without departing from the technical scope of the invention, and it should be noted that such modifications are all covered by the present invention as a matter of course.

I claim:

1. A stereo photographic system comprising:
    a stereo camera equipped with right and left photographing lenses;
    a device mounted on said stereo camera for projecting first indexes adjacent a pair of right and left pictures of a film at a time of photographing;
    a stereo slide mount; and
    second indexes placed on said stereo slide mount adjacent a pair of right and left windows of said stereo slide mount and positioned to come into agreement with the first indexes of the film when the windows of said stereo slide mount and the pair of right and left pictures of the film are brought into agreement with one another.

2. A stereo photographic system comprising:

a stereo camera equipped with right and left photographing lenses a device mounted on said stereo camera for projecting first indexes adjacent a pair of right and left pictures of a film at a time of photographing, each of the pair of right and left pictures having an inner edge and an outer edge; and a mount system comprising a plurality of stereo slide mounts having windows of widths which are stepwisely different; wherein, each of the plurality of stereo slide mounts having right and left windows with inner and outer edges of widths that are stepwisely different and having second indexes at positions to come in agreement with the first indexes of the film when the inner edges of the right and left windows of the stereo slide mount are brought into agreement with the inner edges of the pictures of the film; and wherein the amount of masking outer regions or inner regions of the pictures of the film is adjusted depending upon the width of the windows of the stereo slide mount.

3. A stereo photographic system comprising:

a stereo camera equipped with right and left photographing lenses;

a device mounted on said stereo camera for projecting first indexes adjacent a pair of right and left pictures of the film at a time of photographing;

a stereo slide mount having a pair of right and left windows; and a plurality of framing masks having right and left windows of widths that are stepwisely different; wherein, second indexes positioned adjacent the pair of right and left windows of the stereo slide mount so as to come into agreement with the first indexes of the film when the pair of right and left windows of the stereo slide mount are brought into agreement with the pair right and left pictures of the film; and the framing masks are mounted on the film to adjust the amount of masking outer regions or inner regions of the pictures of the film depending upon the width of the windows of the plurality of framing mask.

4. A stereo photographic system comprising:

a stereo camera equipped with right and left photographing lenses a device mounted on said stereo camera for projecting first vernier graduates adjacent each of a pair of right and left pictures of the film at the time of photographing; and a mount system having right and left windows; wherein, said mount system comprises a base frame having second vernier graduates adjacent each of the right and left windows, and a plurality of cover frames having windows of widths that stepwisely decrease starting from one equal to a width of one of the pair of right and left pictures of the film and having a pitch between the right and left windows equal to a pitch between the right and left windows of the base frame; and whereby positions for mounting the film are adjusted by using vernier graduates comprising the second graduates of the base frame and by the first graduates of the film, and a cover frame of which the inner edges or outer edges of the windows thereof are in agreement with the inner edges or the outer edges of the pictures of the mounted films, is selected and is mounted thereby to adjust the amount of masking the outer regions or the inner regions of the pictures of the film.

5. A stereo photographic system comprising:

a stereo camera equipped with right and left photographing lenses;

a device mounted on said camera for projecting first vernier graduates adjacent a pair of right and left pictures of the film at a time of photographing; and a stereo slide mount having a base frame; wherein, said stereo slide mount has windows of a width smaller than the width of the pictures of the film, second vernier graduates are formed adjacent the windows of the base frame of the stereo slide mount, and an offset amount of the pictures of the film in a right-and-left direction is adjusted relative to the windows of the stereo slide mount by using vernier graduates comprising the second vernier graduates of the base frame and by the first vernier graduates of the films.

6. A stereo photographic system comprising:

a stereo camera equipped with right and left photographing lenses;

a device mounted on said stereo camera for projecting first indexes adjacent right and left pictures of a film at a time of photographing, the right and left pictures separated by a picture width;

a detecting device capable of adjusting a distance between an image of the right and left pictures while viewing the right and left pictures of the film photographed by using the stereo camera, whereby a three-dimensional image is observed;

a stereo slide mount having windows of a width smaller than the picture width of the pictures of the films comprising a base frame with right and left windows; and a printer for printing second indexes adjacent the right and left windows of the base frame of the stereo slide mount; wherein, said detecting device includes right and left optical systems each comprising a projecting lens, a focusing plate having a width smaller than a width of the projected picture and having a collimation pattern, and an eyepiece, and further includes a mechanism for adjusting a gap between the right and left projecting lenses or the focusing plates, and a gap detecting mechanism, the pictures of the pair of right and left films being separately projected onto the right and left focusing plates, the gap between the right and left projecting lenses or the right and left focusing plates being adjusted to change the distance between an image of the right and left pictures, whereby an offset amount of the projected images that produce a suitable three-dimensional effect is detected;

said printer includes a control unit that corrects and prints printing positions of indexes on the base frame based upon offset data detected by the gap detecting mechanism of the detecting device; and the film is mounted in a manner that the first indexes recorded on the film is in agreement with the second indexes printed by the printer on the stereo slide mount, so that the offset amount of the pictures of the films relative to the windows of the stereo slide mount becomes relatively equal to the offset amount of the projected pictures relative to the focusing plates detected by the detecting device.

7. A stereo photographic system comprising:

a detecting device capable of adjusting the distance between images while viewing a pair of right and left pictures of a film photographed by using a stereo camera;

a stereo slide mount having windows of a width narrower than a picture width of the pictures of the film; and a printer for printing mount indexes adjacent right and left windows of a base frame of said stereo slide mount; wherein, said detecting device includes right and left two optical systems each comprising a projecting lens, a focusing plate having a width smaller than a width of a projected picture and having a collimation pattern, and an eyepiece, and further comprising a mechanism for adjusting a gap between the projecting lenses or the focusing plates, the pair of right and left pictures of the film being separately projected onto said right and left focusing plates, the gap between the right and left projecting lenses or the focusing plates being adjusted to change, whereby a distance feeling of the three-dimensional image changes, thereby to detect an offset amount of the projected images that produce a suitable three-dimensional effect, and wherein an image sensor or a light spot detector is disposed adjacent the focusing plates, and a position detector unit is provided to detect the position of a perforation at the edge of the film or to detect a film index that has been recorded on the edge of the film that is projected onto said image sensor or said light spot detector;

the printer includes a control unit that prints the mount indexes on the base frame based upon position data of perforations or film indexes detected by the position detector unit of the detecting device; and the films are mounted in a manner that the mount indexes printed by the printer on the base frame are in agreement with the perforations or film indexes of the films, so that the offset amount of the pictures of the film relative to the windows of the stereo slide mount becomes relatively equal to the offset amount of the projected pictures relative to the focusing plates detected by the detecting device.

8. A stereo photographic system comprising:

a detecting device capable of adjusting a distance between images while viewing a pair of pictures on film photographed by using a stereo camera, the pair of pictures having a picture width;

a stereo slide mount made of a thermoplastic resin comprising a base frame having right and left windows of a width narrower than the picture width of the pictures on the film; and a protuberance-forming device for forming protuberances adjacent the right and left windows of the base frame of said stereo slide mount; wherein, the detecting device includes right and left optical systems each comprising a projecting lens, a focusing plate having a width smaller than a width of the projected picture and having a collimation pattern, and an eyepiece, and further includes a mechanism for adjusting a gap between the projecting lenses or the focusing plates, the pair of pictures on the film being separately projected onto the right and left focusing plates, the gap between the right and left projecting lenses or the focusing plates being adjusted to change the distance between images, whereby an offset amount of the projected images that produce a suitable three-dimensional effect is detected, and wherein an image sensor or a light spot detector is disposed adjacent the focusing plates, and a position detector unit is provided to detect the position of a perforation at an edge of the film projected onto said image sensor or said light spot detector;

the protuberance-forming device comprises a die and heat plungers, and includes a control unit for heat-melt-forming protuberances on the base frame using the die and the heat plungers based upon position data of perforations detected by the position detector unit of the detecting device; and the film is mounted in a manner that the perforations of the film are engaged with the protuberances formed by the protuberance-forming device on the base frame, so that the offset amount of the pictures of the film relative to the windows of the stereo slide mount becomes relatively equal to the offset amount of the projected pictures relative to the focusing plates detected by the detecting device.

9. A stereo photographic system comprising:

a stereo camera, said stereo camera having a location for a right picture image and a left picture image;

a projection device in said stereo camera, said projection device projecting a film index mark adjacent each location for the right picture image and the left picture image, wherein the film index marks are recorded on a film;

a stereo slide mount comprising right and left windows having a window width;

a mount index mark placed on said stereo slide mount, whereby the film is mounted on said stereo slide mount so that the film index mark recorded on the film and the mount index mark placed on the stereo slide mount come into agreement.

10. A stereo photographic system as in claim 9 wherein:

the film index mark and said mount index mark comprises a vernier.

11. A stereo photographic system as in claim 9 further comprising:

a plurality of stereo slide mounts, each of said plurality of stereo slide mounts having a different window width.

12. A stereo photographic system as in claim 9 further comprising:

a plurality of framing masks adapted to fit over the right and left windows of said stereo slide mount, each of said plurality of framing masks having a framing window with a different window width.

13. A stereo photographic system comprising:

a stereo camera imaging a left and right picture onto a film;

a stereo image detecting device comprising, a film guide adapted to hold the film;

a pair of lens holders;

a pair of lenses mounted in said pair of lens holders;

a pair of focus plates positioned adjacent said pair of lenses, said pair of focus plates receiving a pair of images projected from the film;

means for moving the pair of images apart a selected distance providing a stereoscopic image;

means for placing a film index mark on the film adjacent each of the left and right pictures;

a stereo slide mount having a left and right window;

means, coupled to said stereo image detecting device, for placing a mount index mark on said stereo slide mount adjacent each of the left and right windows, whereby when the film is mounted in said stereo slide mount so that the film index mark and the mount index mark are aligned a stereoscopic image is obtained.

14. A stereo photographic system as in claim 13 wherein:

said means for placing a film index mark on the film comprises a projection device mounted on said stereo camera.

15. A stereo photographic system as in claim 13 wherein:

said means for placing a film index mark on the film comprises a printer.

16. A stereo photographic system for positioning and mounting a pair of films having a picture thereon comprising:

a stereo slide mount having a pair of windows therein;

detecting means for viewing the pair of films and positioning an image of the picture on the pair of films so as to form a stereoscopic image at a stereoscopic position;

a detector associated with said detecting means, said detector detecting a location of a perforation in each of the pair of films relative to the stereoscopic position; and protuberance forming means for forming a protuberance in said stereo slide mount at a location adjacent each of the pair of windows so as to receive the perforation in each of the pair of films wherein the stereoscopic position determined by said detecting means is maintained when the pair of films are mounted in said stereo slide mount, whereby the pair of films are positioned properly within said stereo slide mount to form a stereoscopic image when viewed.

17. A stereo photographic system for mounting a stereo slide comprising:

a film having a first vernier scale portion printed thereon; and a slide mount having a second vernier scale portion printed thereon, said first vernier scale portion and said second vernier scale portion when slid along each other forming a vernier, whereby the vernier aids in positioning of said film on said slide mount to form a stereoscopic image when viewed.

18. A method of mounting a pair of films each having a picture thereon for forming a stereo image comprising the steps of:

viewing the pictures with a detecting device;

positioning the pictures within the detecting device to a stereo position to form a stereoscopic image;

identifying a location of a film index mark placed on each of the pair of films adjacent each of the pictures relative to the stereo position;

identifying a location of a mount index mark placed adjacent each of a pair of windows on a stereo mount relative to the stereo position; and mounting the pair of films on the stereo mount so that the film index mark and the mount index mark maintain their position relative to the stereo position, whereby the stereo mount may be viewed forming a stereoscopic image.

* * * * *